United States Patent
Hammond et al.

(10) Patent No.: US 6,222,284 B1
(45) Date of Patent: Apr. 24, 2001

(54) MULTIPHASE POWER SUPPLY WITH SERIES CONNECTED POWER CELLS WITH FAILED CELL BYPASS

(75) Inventors: Peter W. Hammond, Westmoreland County; Marc F. Aiello, Allegheny County, both of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/413,563

(22) Filed: Oct. 6, 1999

Related U.S. Application Data

(62) Division of application No. 09/082,888, filed on May 21, 1998, now Pat. No. 5,986,909.

(51) Int. Cl.[7] ............................. H01H 33/32; H01H 9/00; H01H 83/00
(52) U.S. Cl. ........................ 307/125; 320/122; 320/120; 200/43.16; 200/290; 200/318; 200/323; 307/144
(58) Field of Search ................................ 200/1 R, 43.16, 200/290, 318, 323; 307/125, 142, 144, 54, 71; 320/120, 122

(56) References Cited

U.S. PATENT DOCUMENTS

| | | | |
|---|---|---|---|
| 3,609,507 | 9/1971 | Beck | 363/56 |
| 4,039,925 | 8/1977 | Fletcher et al. | 363/70 |
| 4,150,425 | 4/1979 | Nagano et al. | 363/56 |
| 4,303,877 | * 12/1981 | Meinhold | 320/6 |
| 4,426,611 | 1/1984 | Espelage et al. | 363/71 |
| 4,698,738 | 10/1987 | Miller et al. | 363/65 |
| 5,008,797 | 4/1991 | Patel et al. | 363/37 |
| 5,073,848 | 12/1991 | Steigerwald et al. | 363/65 |
| 5,179,510 | 1/1993 | Tokiwa et al. | 363/65 |
| 5,319,536 | 6/1994 | Malik | 363/70 |
| 5,625,545 | 4/1997 | Hammond | 363/71 |
| 5,708,576 | 1/1998 | Jones et al. | 363/65 |
| 5,710,504 | * 1/1998 | Pascual et al. | 320/6 |
| 5,744,936 | * 4/1998 | Kawakami | 320/120 |
| 5,814,970 | * 9/1998 | Schmidt | 320/122 |
| 5,850,136 | * 12/1998 | Kaneko | 320/122 |
| 5,898,239 | * 4/1999 | Kawam | 307/125 |
| 5,952,815 | * 9/1999 | Rouillard et al. | 320/122 |

FOREIGN PATENT DOCUMENTS 45-2703   1/1970   (JP).

* cited by examiner

*Primary Examiner*—Josie Ballato
*Assistant Examiner*—Rios Roberto
(74) *Attorney, Agent, or Firm*—Buchanan Ingersoll, P.C.

(57) ABSTRACT

A high output level is maintained in power supplies having multiple cells in each leg. Failed cells in any leg are bypassed to provide a current path through the respective leg. All of the unfailed cells are utilized while maintaining equal magnitude between phases and a balance phase relationship in the line-to-line output voltage. The invention may be utilized in conjunction with a peak voltage reduction circuit, and a by-pass switch.

5 Claims, 14 Drawing Sheets

BALANCE RESTORED AFTER LOSS OF A4
AND A5 BY INHIBITING B4, B5, C4, AND C5
MAXIMUM VOLTAGE = 2494 (60%)

BALANCE RESTORED AFTER LOSS OF A4
AND A5 BY ADJUSTING ANGLES
MAXIMUM VOLTAGE = 3542 (85%)

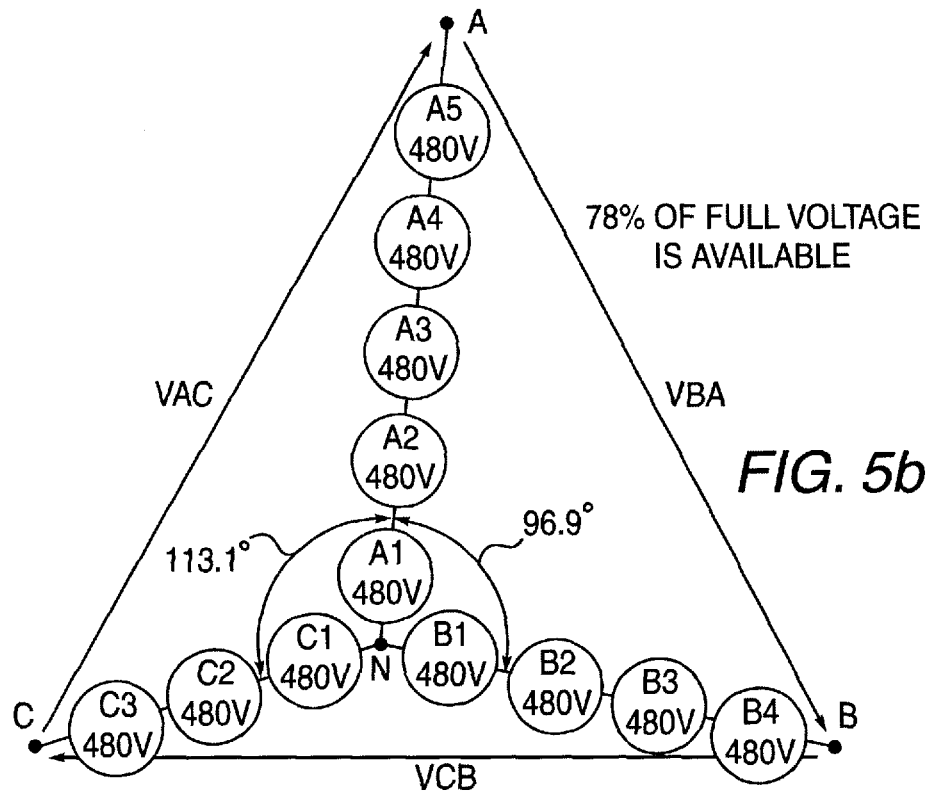
BALANCE RESTORED TO SYSTEM WITH 5 CELLS PER PHASE
AFTER LOSS OF 1 CELL IN PHASE B AND 2 CELLS IN PHASE C
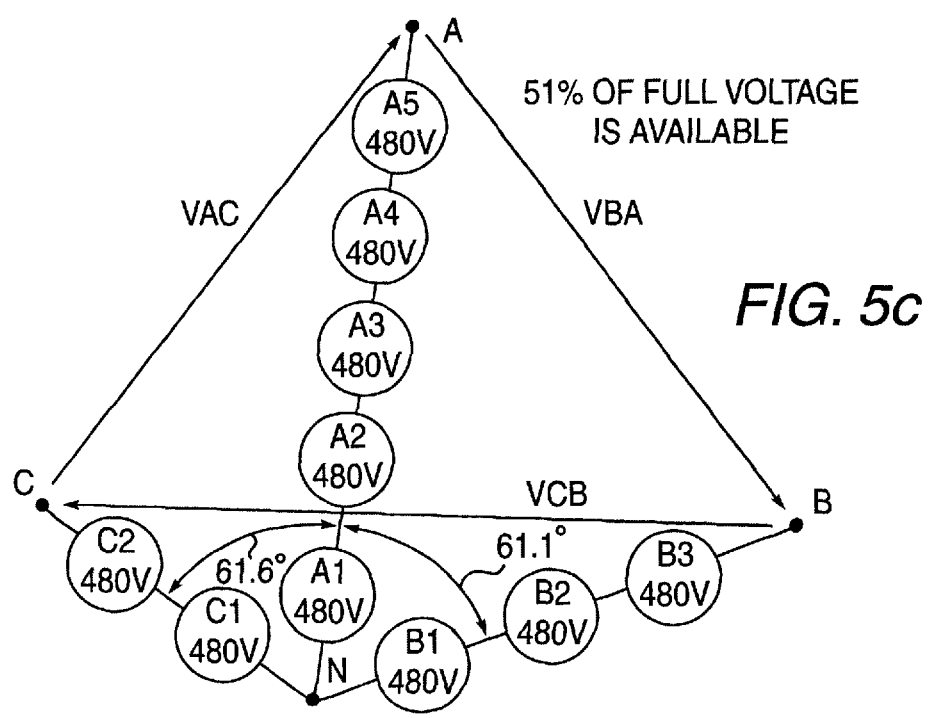
BALANCE RESTORED TO SYSTEM WITH 5 CELLS PER PHASE
AFTER LOSS OF 1 CELL IN PHASE B AND 2 CELLS IN PHASE C PEAK-REDUCTION METHOD OF FIG. 6, MODIFIED TO ALSO IMPLEMENT THE NEW BYPASS CONTROL SINUSOIDAL VOLTAGE COMMANDS FROM FIG. 7, WHEN CELLS B4 AND B5 ARE BYPASSED (KA=1, KB=1.67, AND KC=1)

UMAX AND UMIN) FROM FIG. 7, WHEN CELLS B4 AND B5 ARE BYPASSED (KA=1, KB=1.67, AND KC=1)

UCOM = (UMAX + UMIN)/2 FROM FIG. 7, WHEN CELLS B4 AND B5 ARE BYPASSED (KA=1, KB=1.67, AND KC=1)

EB* = UB* FROM FIG. 7, WHEN CELLS B4 AND B5 ARE BYPASSED (KA=1, KB=1.67, AND KC=1)

SINUSOIDAL VOLTAGE COMMANDS FROM FIG. 7, WHEN CELLS A2, A3, A4 AND A5 ARE BYPASSED (KA=5, KB=1, AND KC=1)

UMAX AND UMIN) FROM FIG. 7, WHEN CELLS A2, A3, A4 AND A5 ARE BYPASSED (KA=5, KB=1, AND KC=1)

UCOM = (UMAX + UMIN)/2 FROM FIG. 7, WHEN CELLS A2, A3, A4 AND A5 ARE BYPASSED (KA=5, KB=1, AND KC=1)

EA* = UB* FROM FIG. 7, WHEN CELLS A2, A3, A4 AND A5 ARE BYPASSED (KA=5, KB=1, AND KC=1)

MULTIPHASE POWER SUPPLY WITH SERIES CONNECTED POWER CELLS WITH FAILED CELL BYPASS

This application is a divisional application of U.S. patent application Ser. No. 09/082,888, filed May 21, 1998, now U.S. Pat. No. 5,986,909 which is hereby incorporated herein by reference.

BACKGROUND OF THE INVENTION

I. Field of the Invention

This invention relates to a drive and specifically a drive and a method for operating a variable drive such as a variable-speed motor drive system.

II. Description of Prior Art

Variable-output drives traditionally are used in industry to provide variable electric power to AC motors. These same drives can be used in other applications not related specifically to motors but where a variable-output voltage or frequency is desired. Typical drives have an AC input power source and some type of conversion apparatus, usually using solid-state devices, for converting the fixed AC input voltage into a variable-voltage and/or variable-frequency output. One such type of drive is described in U.S. Pat. No. 5,625,545, which is incorporated herein by reference. That patent describes a power supply used as a drive which utilizes a number of power cells arranged to produce a three-phase AC output. Such multiple power cells in series can be utilized to provide higher voltage outputs than would be available with only a single cell. However, should a given cell in a series arrangement fail during operation, that current path can become open-circuited, rendering the entire drive inoperable. In many applications, especially industrial applications utilizing variable-speed drives, it is desirable to continue to operate in a reduced mode when a single cell fails. One method to do such a reduced operation is to short out the damaged or failed cell. This can then result in an unbalanced output, in that the leg having the shorted cell must operate at less than full voltage. Such operation can create imbalanced line conditions and be damaging to load elements. Therefore, when a cell fails in a series arrangement, it is usually desirable to permit operation at a reduced voltage or speed by shunting out an equal number of cells in each of the other legs. While the output from such a drive having shunted cells in each leg is reduced, it does permit the drive to operate at a reduced voltage or speed. Often times such reduced operation is highly desirable so that the process being controlled by the drive can continue until it is convenient to shut down for repairs. In addition, it may be desirable to operate the drive at a reduced-voltage condition so as to maintain a desired minimum level of production. Typically, when a drive having multiple converters arranged in series has a failure, the output voltage and power available is reduced proportional to the ratio of the number of unfailed cells in a given leg divided by the number of total cells in such leg. As an example, if one of the cells in the aforesaid patent, such as power cell $A_1$ were to fail, typically power cells $A_1$, $B_1$ and $C_1$ would be shunted by appropriate bypass circuitry. Such circuitry is shown in FIG. 9 of the U.S. Pat. No. 5,625,545 patent. When operating under such bypass condition, the output of the three-phase drive at references 22, 25 and 24 is proportionally reduced by one-third. In such an operating condition, the output voltage available to the motor would only be 66% of the full voltage. In such a condition, the motor would only be able to reach approximately two-thirds of its rated speed.

In many applications being able to reach even 66% of rated speed in a failed cell mode is desirable. However, it still represents a substantial reduction in the output speed and power available from the drive. When multiple power cells or converters are used in series, the total power delivered to the load is usually supplied generally equally by all the power cells. Thus in the example above when one of nine cells fails, 89% of rated power should still be available. By shunting out or bypassing two operational power cells such as $B_1$ and $C_1$ in the example, these power cells can no longer contribute to the output power available to the load. It would be very desirable, then, to optimize the output voltage and power available to the load during a failed cell condition. The invention provides for an apparatus and a method that permits operation during a failed mode at a power output that utilizes all of the cells or converters that are operational.

SUMMARY OF THE INVENTION

The invention is directed to a method of operating a multiphase power supply that has a plurality of cells or converters connected in series in each of a plurality of legs. This results in each leg having a leg voltage equal to the sum of connected cells in such leg. In addition, the power supply has a line-to-line voltage output between the terminal ends of each pairs of legs. This invention applies to loads that are not connected to the common leg junction, but only to the end points of the legs, so that only the line-to-line output voltage appears on the load. During a failed condition in which any one or number of cells have failed in any of the legs, the line-to-line voltage output is maximized. This is done by detecting failed cells in any of the legs and forming a current path around such failed cell by an electrical bypass. As a result no voltage component from the failed cell is included within the leg in which it previously was connected. The outputs of the unfailed cells are controlled so as to maximize the line-to-line voltage in the output of the power supply so that their magnitudes are generally equal. By so regulating their outputs, the line-to-line phase voltages of the output of the power supply can be balanced. In a three-phase output supply without failed cells, balanced voltage is maintained by having a 120° phase relationship between the leg output voltages. The line-to-line phase balance can be restored by adjusting the leg-to-leg phase relationship between the respective legs when failed cells are detected. Circuitry is provided to implement a method for reducing the peak voltage demands between legs. Voltage command signals can be generated to provide peak voltage reduction, and such signals can be modified to compensate for the detection of failed cells. The modification can be a gain control using a gain which is proportional to the ratio of the total number of cells in the leg (including failed cells) divided by the number of active cells (not bypassed) in the leg. The invention is particularly adapted to pulse width modulated serial converters in each leg. The result is balanced line-to-line output from the power supply and full utilization of each unfailed cell in the system.

DESCRIPTION OF THE DRAWINGS

FIG. 1b is a diagrammatic representation showing the converter circuitry of an embodiment of one cell such as those shown in FIG. 1a.

FIG. 1c is a diagrammatic representation of an embodiment of a control signal scheme that could be used to control a five-cell-per-leg drive such as shown in FIG. 1a.

FIG. 5b is a voltage diagram of an array operating after the loss of one cell in phase B and two cells in phase C.

FIG. 5c is a voltage diagram of an array operating after the loss of two cells in phase B and three cells in phase C.

DESCRIPTION OF SOME EMBODIMENTS

Figure 1A:
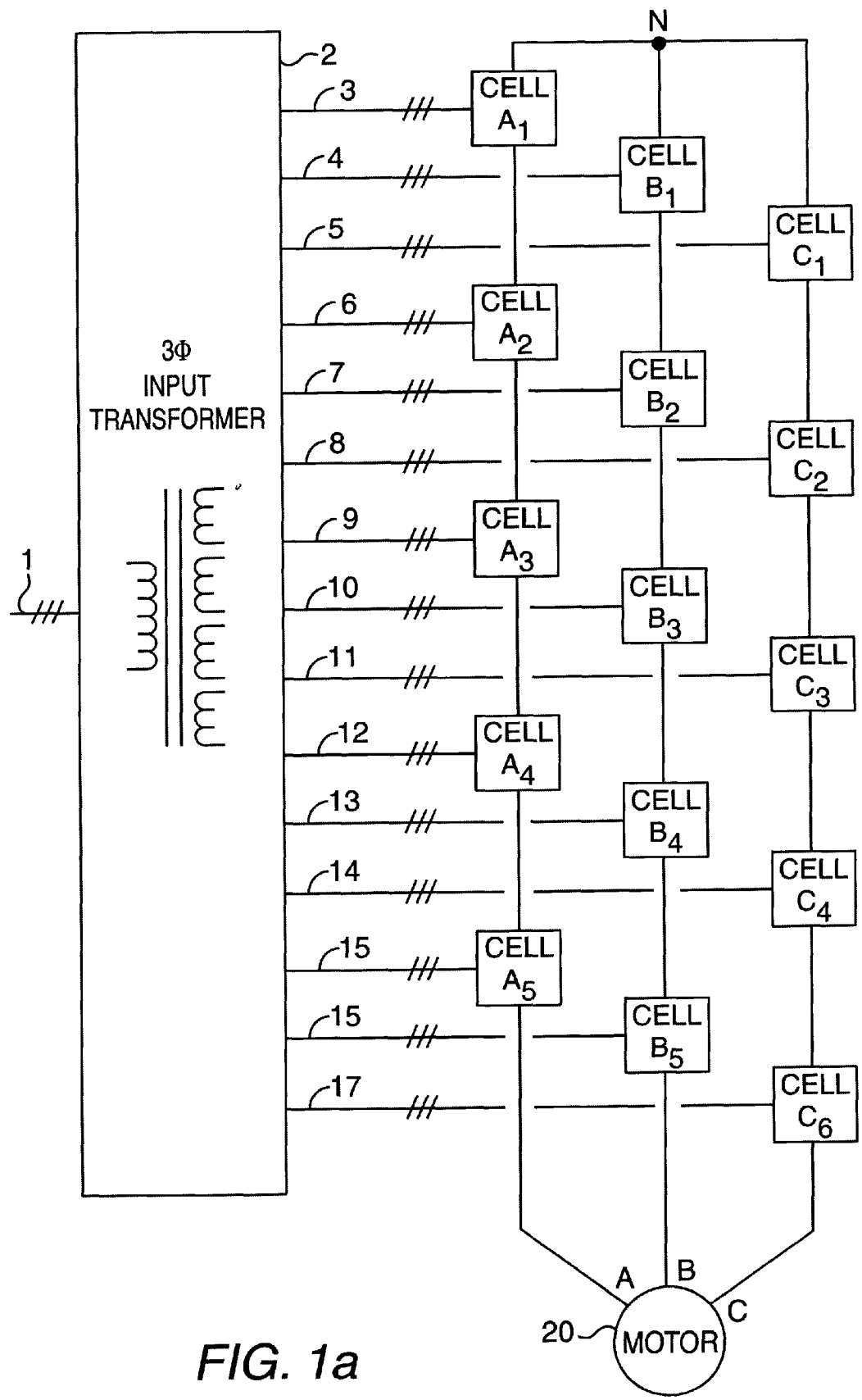
FIG. 1a is a diagram showing the power circuitry of an embodiment having five power cells in each leg of a three-phase drive.
Figure 15:
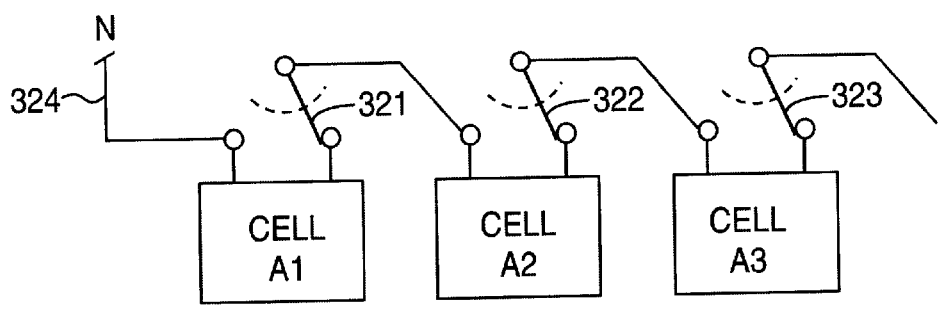
FIG. 15 is a diagram of a 3-cell arrangement using transfer switches.

FIG. 1a shows a power circuit diagram for an AC drive. This is a typical arrangement in which the invention can be utilized, however, other drives and power supplies can also utilize the apparatus and method of this invention. A three-phase incoming line 1 feeds into a power transformer 2. As shown, power transformer 2 may be of any configuration, and in some preferred embodiments will be the multiple winding three-phase isolation transformer as shown in U.S. Pat. No. 5,625,545. Such a transformer may have a primary winding which is star or mesh connected, which is energized from the three-phase incoming line 1. The transformer may then energize a number of single or multi-phase secondary windings. In presently preferred embodiments, there will be a number of secondary windings each corresponding to a respective converter or power cell in the drive. It is also preferred that the windings be preselected to certain degrees of electrical phase such as taught in the aforementioned patent. In some applications other transformer configurations will be utilized, and in certain applications an incoming isolation transformer need not be utilized at all. As shown in FIG. 1a, the incoming transformer or other AC power supply feeds individual power converters. In FIG. 1a, 15 power cells or converters are utilized. In this circuit arrangement, there are three legs in the output line, each having five power converters. Leg A has converters $A_1$ through $A_5$. Leg B contains power converters $B_1$ through $B_5$, and leg C contains power converters $C_1$ through $C_5$. The voltage available in any leg is the result of the sum of the individual power cells in that leg, such that leg A has an output voltage which is the sum of power converters $A_1$ through $A_5$. Similarly, leg B has an output voltage which is the sum of its converters, $B_1$ through $B_5$, and leg C has an output voltage which is the sum of the five converters arranged in series $C_1$ through $C_5$. The drive feeds three-phase power to a motor 20, which may be any load but in the diagram shown would commonly be an induction motor. This application is understood to produce a variable-speed AC drive. As such, it may control process motors, fans, pumps or other equipment. It is usually desirable to maintain a variable-speed operation, either during an initial start-up or a process run. As such, the voltage available to the motor at terminals A, B and C is varied by control of the drive. The motor 20 sees a voltage between terminals A–B as the sum of the voltages of the individual power converters in leg A and leg B. As a result, the motor voltage available at terminals A–B equals the sum of the power cells $(A_1+A_2+A_3+A_4+A_5-B_1-B_2-B_3-B_4-B_5)$. Respective other motor terminal voltages are also the summation of the voltages in the connections between their respective terminals. As such, the voltage between terminals B and C comprises the sum of the power cells $(B_1+B_2+B_3+B_4+B_5-C_1-C_2-C_3-C_4-C_5)$. In a like manner the voltage from terminal C to A comprises the sum of the converter voltages $(C_1+C_2+C_3+C_4+C_5-A_1-A_2-A_3-A_4-A_5)$. Each leg of the drive as shown is connected in a star having a common or neutral point N, which is not connected to the load, in this case motor 20. The output voltage component from each leg comprises the sum of the power cells in the respective leg from the neutral to the motor terminal. Output voltage in leg A is measured between terminal A and N, the neutral point of the converter arrangement. It includes the sum of the voltages on converters $A_1$ through $A_5$. As can be seen if converter cell $A_1$ was to fail, the available voltage to the load, in this case motor 20, would be decreased in the voltage measured from A to N, as one cell has been removed from that leg. If a drive is to be operated under this mode wherein one of the cells has failed such as, for example, cell $A_1$, that cell can be shorted or bypassed. To balance the output, typically another cell in each of the other respective legs would also be bypassed. As an example, should cell $A_1$ fail, it is common practice to bypass cells $A_1$, $B_1$ and $C_1$. As a result, the output voltages available to the motor terminals A, B and C would remain balanced. However, the available output voltage and output power would be reduced, because the number of active power cells being utilized in the circuitry has been reduced. However, in practicing the present invention, should cell $A_1$ fail, it can be bypassed and cells $B_1$ and $C_1$ can remain operational such that the output, voltage and power can be maintained at a higher maximum level.

Figure 1B:
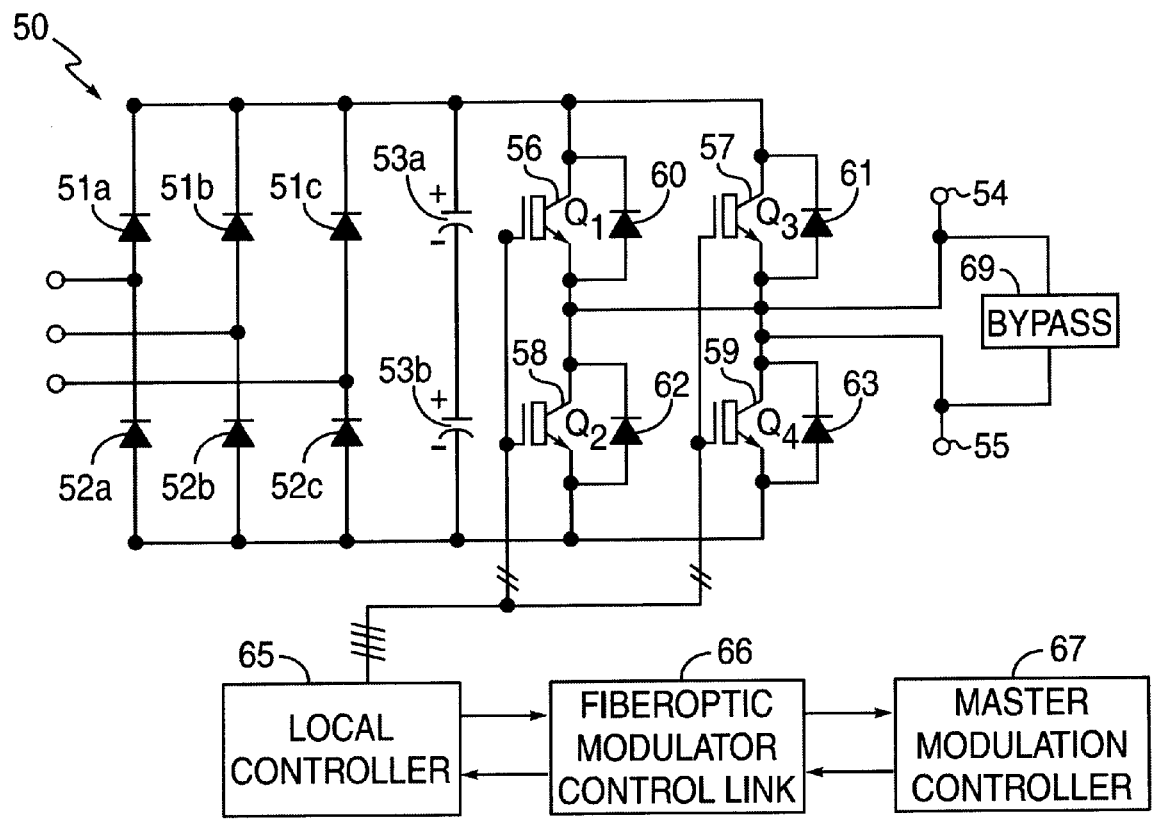

FIG. 1b shows a typical power cell or converter such as $A_{1-5}$, $B_{1-5}$ and $C_{1-5}$, as shown in FIG. 1a. However, it is to be understood that other power cells or power converters can be utilized in practicing this invention. The power cell and control shown in FIG. 1b is similar to that shown in U.S. Pat. No. 5,625,545. However, the master controller provides for control of the individual power cell in a manner that permits high output operation during a failed mode. Power cell 50, as shown, is a power converter which converts the three-phase incoming power into a DC component through utilization of a rectifier composed of diodes $51_a$–$51_c$ and $52_a$–$52_c$. The output of this rectifier is then directed across capacitors $53_a$ and $53_b$, which can provide storage and smoothing of the DC output. Capacitors $53_a$ and $53_b$ are representative of a capacitor bank, and the precise amount of capacitance necessary depends upon the specific application. The DC power in the converter can be selectively applied to the converter outputs 54 and 55 using a pulse-width modulated (PWM) method. The pulse-width modulation may be implemented using a bridge converter which is composed of semiconductor switches such as $Q_{1-4}$. Any type of acceptable switch element can be used; and depending on the power level, various solid-state components may be chosen. As shown, the converter output utilizes four transistors 56, 57, 58 and 59. In such a pulse-width modulated operation the switches can be considered either fully on or fully off as they operate. The circuit shown in FIG. 1b also utilizes four diodes 60–63 across each of the solid-state switch units. As will be understood in most applications, it is desirable that the power cells or converters utilized in a multiconverter arrangement be similar and constructed in a form so as to limit the number of subassemblies and permit converters to be interchangeable within the same drive. Converter 50 as shown in FIG. 1b could be utilized for all of the 15 converters in FIG. 1a. Also shown as part of the power converter in FIG. 1b is a bypass 69. The bypass may also be constructed as an integral part of a converter subassembly in a drive unit. In other applications the bypass 69 can be separately mounted. The bypass 69 may be mechanical, electrical or solid state. As presently preferred, the bypass unit utilized would be solid state and similar to that shown in FIG. 9 of U.S. Pat. No. 5,625,545. When bypass 69 is operated, it in effect creates a shunt path between the respective output lines 54 and 55 of the converter. As such, current can then be carried through the bypass 69 instead of the converter. If a failed converter which has failed in an open-circuit mode is not bypassed, the current through that leg goes to zero. It is therefore desirable to have a bypass circuit such as 69 on each of the respective converter outputs. Many ways are known as to monitoring and detecting a failed cell, and these may be used. A simple method is to compare cell output voltage to the commanded output. Other methods can include checking or verifying cell components or use of diagnostics routines. While the discussion of the invention may at times for simplicity imply that only a single cell fails, it is to be understood that the invention also covers apparatus and methods utilized to permit continued operation with one or more cells having failed in a given leg or legs. As such, the invention can operate not only when a single cell such as $A_1$ in FIG. 1a fails but would also provide increased effective operation should multiple cells such as, for example, $A_1$, $B_2$, $B_3$ and $C_4$ fail.

As shown in FIG. 1b, the converter is controlled through the utilization of a local controller, such as shown at reference 65. It may be desirable that the local controller also be associated with and contained in the individual cell or converter. As such, it will control the specific converter, such as utilization of pulse-width modulation or other control techniques. The operation of the converter may be utilized to control not only the output voltage but to control it in a manner that results in specific desired waveforms. The operation of the local controller may be operated as described in the previously referenced patent. When the local controller is located on the individual converter, it may be desirable that the control signals received from the master controller 67 are transmitted to the local controller through utilization of a fiber optic system, such as for example a fiber optic control link 66. It is to be understood that in practicing the invention, certain control functions may be grouped together in the master control such that a local controller is not necessary, and that signal transfer may be utilized in other means besides the utilization of fiber optics, such as traditional wiring.

Figure 1C:
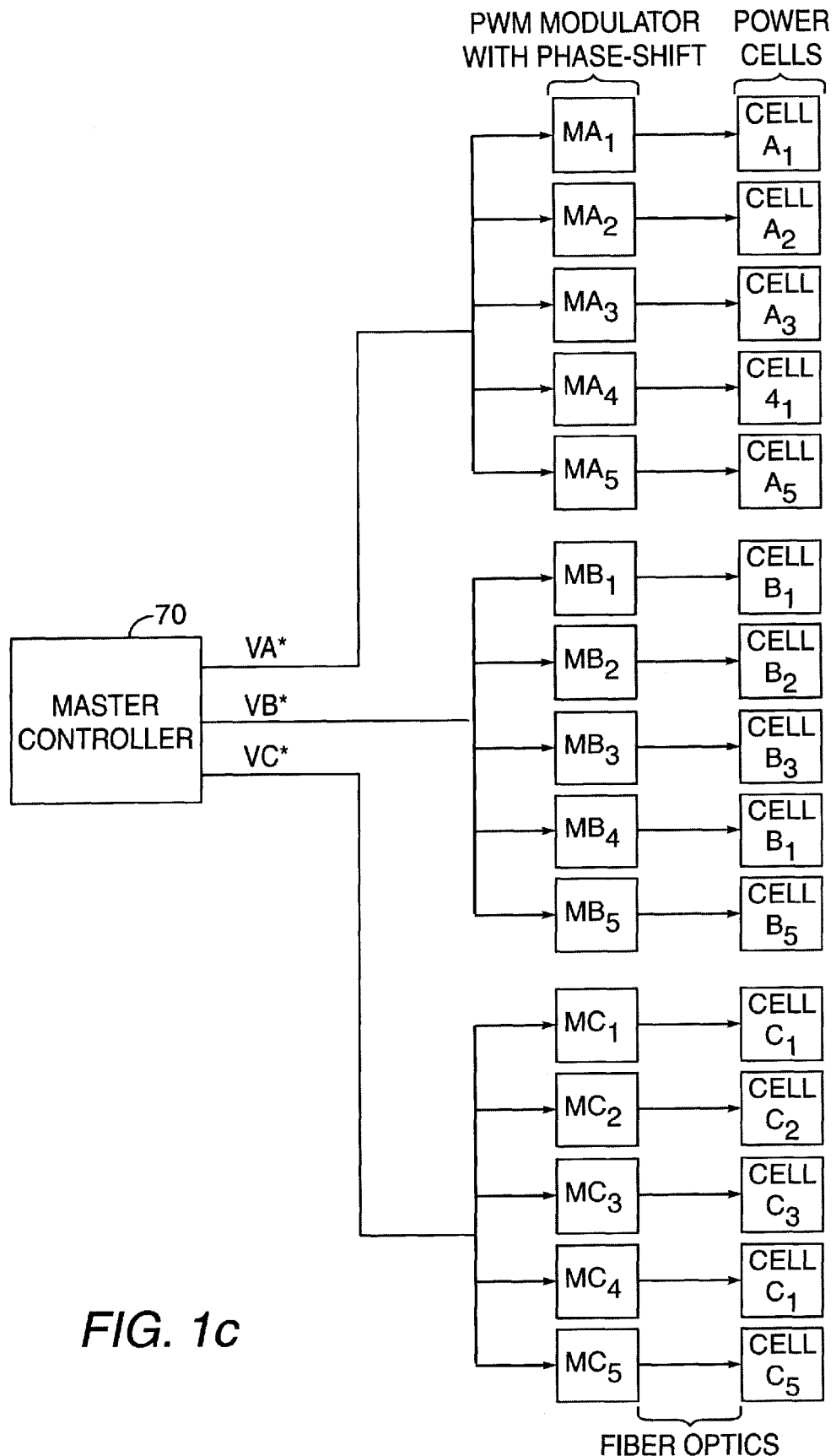

In instances where a local controller is contained in the individual power cell subassembly, signals to that assembly may be generated from a master controller. FIG. 1c shows a master controller 70, which is utilized to generate different signals $V_A^*$, $V_B^*$ and $V_C^*$. These signals $V_A^*$, $V_B^*$ and $V_C^*$ are commands or replicas of the desired voltage output from the respective converters on Leg A, Leg B, and Leg C. Master controller 70 feeds control signal $V_A^*$ to the A leg converters $A_1$ through $A_5$, respectively. Similarly, the master controller can control a signal, $V_B^*$, to controllers $B_1$ through $B_5$. The master controller can also direct a signal to the third leg, C, through signal $V_C^*$ to converter $C_1$ through $C_5$. A PWM modulator can be used to convert each voltage command into variable duty-cycle switching patterns for the transistors 56, 57, 58, and 59 in FIG. 1b. It is understood that the control scheme shown in FIG. 1c is only one of many control schemes that may be utilized in practicing the invention.

While prior practice in response to a failed cell has been to short out equal numbers of cells in all three phases, even though some of such cells are still functional, the invention utilizes a method in which all functional cells can contribute to a balanced output voltage.

Figure 1D:
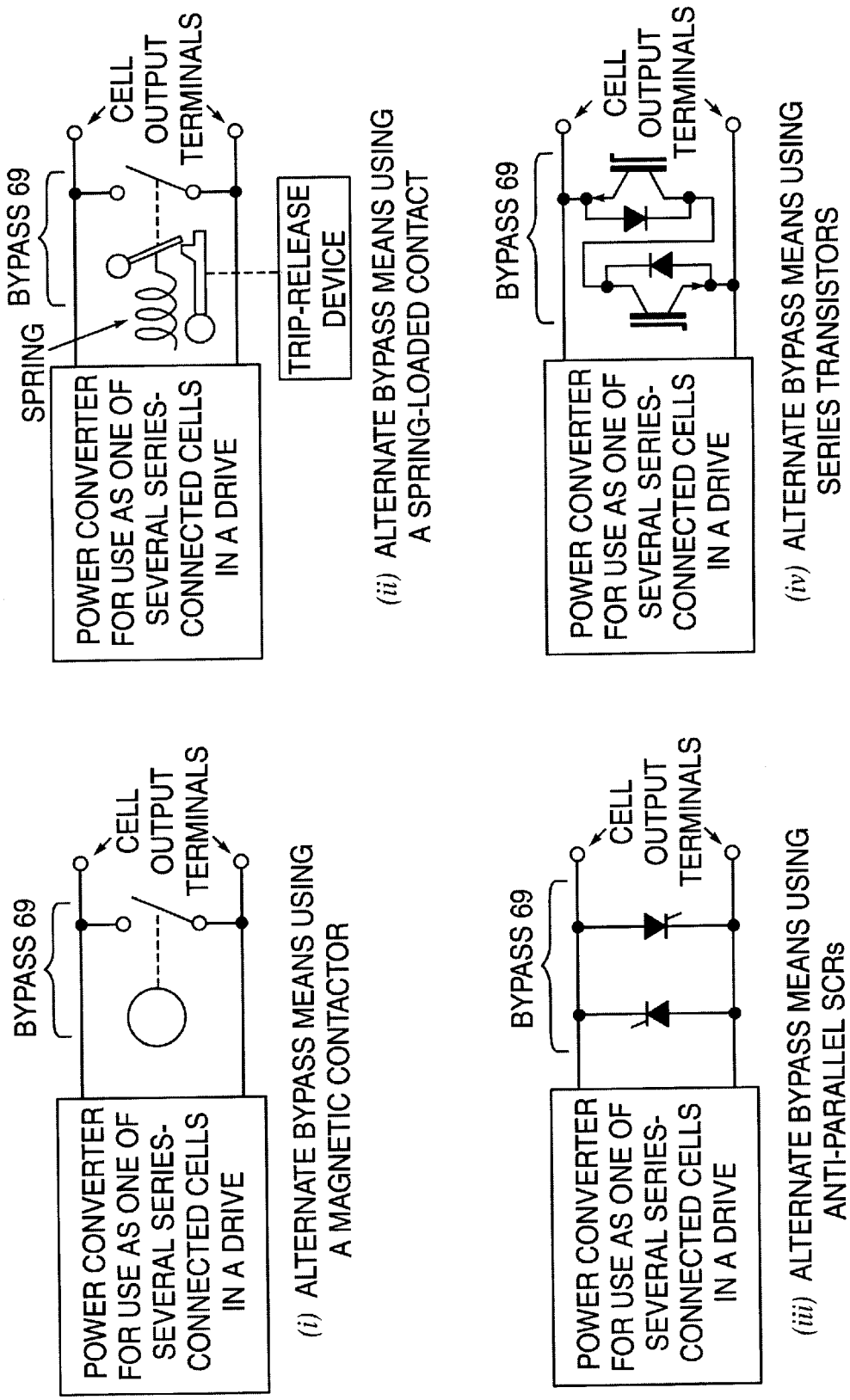
FIG. 1d shows four alternative embodiments of a cell bypass.

FIG. 1d shows some embodiments that alternatively may be used for bypass of a failed cell. Alternative i in FIG. 1d shows a power converter cell being bypassed by the contacts of a relay or contactor. When the contact, shown in its open position is energized by the solenoid, a shunt path is created between the cell output terminals. An alternative bypass may be utilized as shown in ii. In this alternative, a trip release device causes a spring loaded contact to provide a shunt path between the cell output terminals. The trip release device may be electrically or mechanically operated, and in some embodiments may function as an open circuit detection device. iii shows a power converter which has across its output terminals a bypass circuit utilizing two silicon controlled rectifiers having reversed polarities. By turning on both SCRs a shunt path exists between the cell output terminals. Depending upon the cost and specific application, a similar bypass may be constructed using series transistors as shown in alternative iv.

Figure 2:
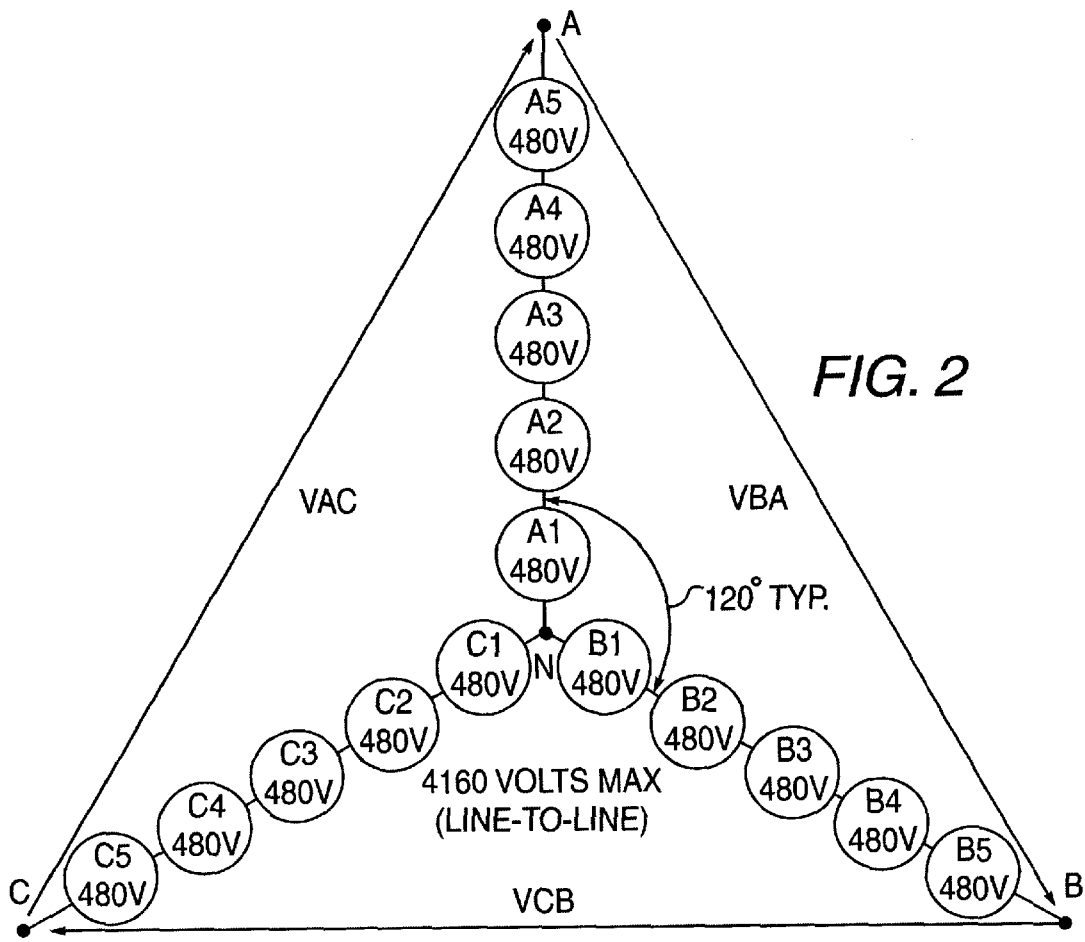
FIG. 2 is a voltage diagram of a typical array of five cells connected in series in each leg of a three-phase output.

FIG. 2 shows a typical array of series-connected cells drawn to illustrate the voltage from each leg and the phase displacement between legs. Each cell is capable of generating AC-output voltage of, for example, 480 volts. Each cell is represented by a circle, with 5 cells connected in each leg between the neutral point N and the respective points A, B and C. As shown, such an array can typically generate up to approximately 2,400 volts from point N to each of points A, B and C. If the control makes these three voltages equal in magnitude and mutually phase displaced by 120°, then the array will produce a balanced three-phase AC output voltage. In this case the maximum available line-to-line output voltage from the array shown in FIG. 2 can be 4,160 volts. If one or more cells fail, it is possible to short-circuit the cell output terminals and continue operation at a reduced voltage. The inactive cell or cells can be bypassed, as was described in FIG. 1b.

Figure 3:
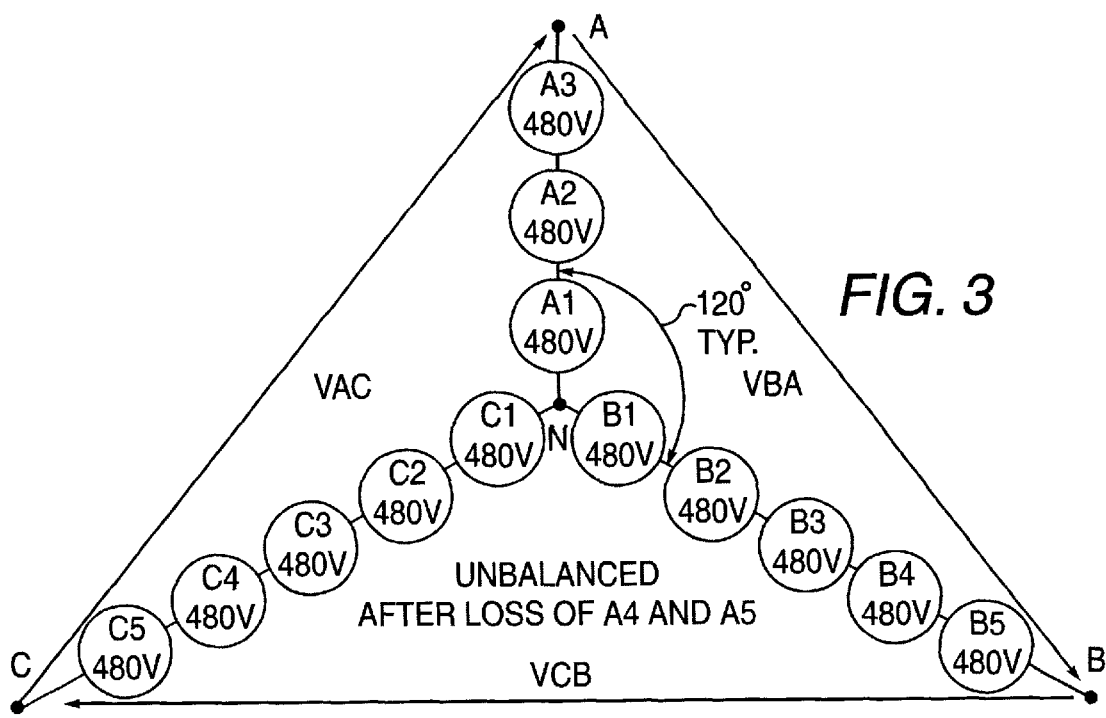
FIG. 3 is a diagrammatic representation of voltage in an array similar to that shown in FIG. 2 but having two failed cells out of leg A.
Figure 4:
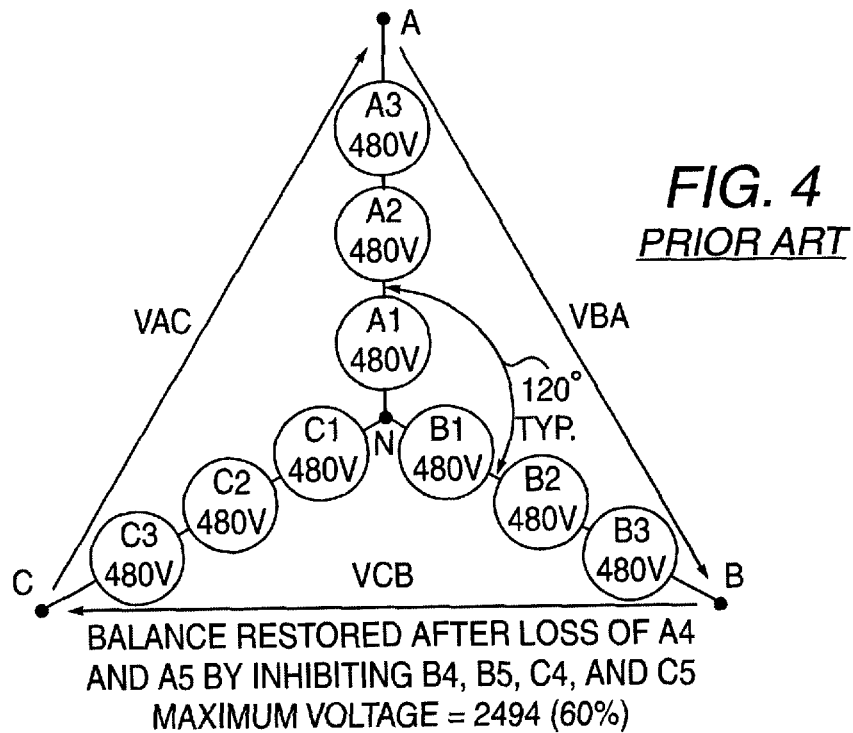
FIG. 4 (Prior Art) is a voltage diagram showing a prior art method of operating with two failed cells in leg A and two cells removed from each of leg B and C.

FIG. 3 shows the voltage available after cells A4 and A5 have been bypassed. Because they have been bypassed, they do not show in the voltage diagram in FIG. 3, as they do not contribute to the total voltage in the array. Bypassed cells A4 and A5 were in leg A, which extends from N to point A. As shown in FIG. 3, only three cells, A1, A2 and A3, now remain in the leg from N to A. This is because there is no component of voltage remaining from the bypass cells. As a result, the maximum voltage available from leg A (between point N and point A) has been reduced by 40% to approximately 1,440 volts. As shown, the full voltage is still available in the other legs from N to C and from N to B. If the control would continue to maintain the mutual-phase displacement angle at 120°, for example, then the output voltage will be unbalanced, as the voltage VCB would be much larger than the voltages VAC and VBA. Such an unbalanced output voltage would be unsuitable for driving a load such as a standard AC induction motor. To avoid this undesirable condition and still maintain some operation of the load, it has been a practice in prior art after one or more cells have failed to bypass the same number of cells in all three phases. Even though many of these cells are still fully functional, the desire to balance the output voltage to the load has exceeded the desire to use all available cells. In this condition the maximum output voltage from the entire array is then limited to the capacity of the phase having the most failed cells in a leg. The extra power capacity available in functional cells that have been bypassed to maintain a balanced output is not utilized. FIG. 4 shows the array of FIG. 3 after failed cells A4 and A5 have been bypassed, and in addition, functional cells B4, B5, C4, and C5 have also been bypassed. The maximum balanced line-to-line voltage in this figure is 60% of the rated voltage or, in the example, 2,494 volts. It is important to understand that the connection from the array of converters or cells to the motor terminals normally consists of only three wires. The neutral point, N, of the array is usually not connected to the neutral of the motor. Therefore, it does not matter to the motor whether the leg voltages from point N to points A, B and C have the same magnitude or even whether they are mutually phase-displaced by 120°. The motor requires only that the line-to-line voltages VAC, VBA and VCB have equal magnitude and are mutually phase-displaced by 120°. While the circuitry of FIG. 4 provides balanced-output voltages and a phase displacement of 120°, it does not utilize the full capacity of all of the functional cells in the drive.

Figure 5A:
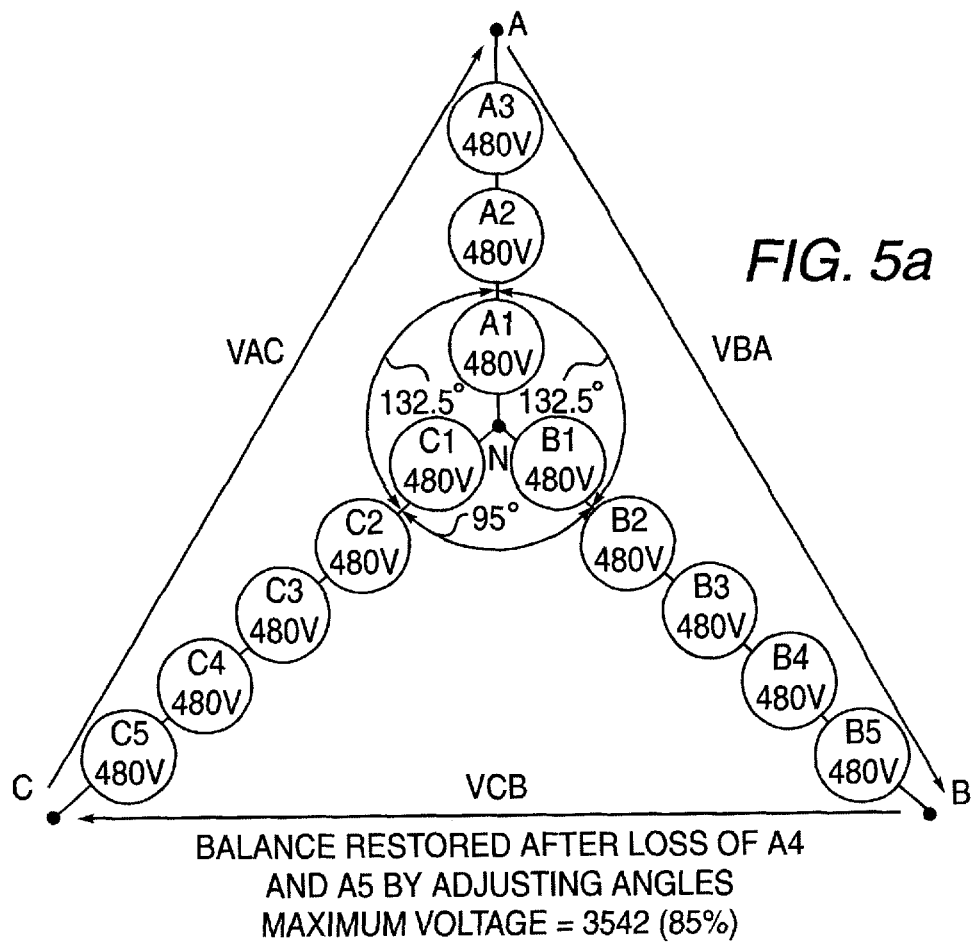
FIG. 5a is a voltage diagram of an array operating without two failed cells in leg A but utilizing all five cells in legs B and C.

FIG. 5a shows how an array such as FIG. 1 could be configured after failure of cells $A_4$ and $A_5$. The figure assumes that cells $A_4$ and $A_5$, because of failure, have been bypassed and therefore have no contribution from these cells to the overall voltage in leg A, the voltage from N to A. The operation of the drive to achieve the voltage diagram in FIG. 5 utilizes a phase angle between phase B and C that has been reduced from 120° to 95°. The remaining angles between A and C and between B and A have been increased from 120° to 132.5°. These angles now result in the line-to-line voltages VAC, VBA and VCB having equal magnitudes. In addition, the mutual phase displacement in FIG. 5a is 120° between VAC, VCB and VBA. The maximum balanced line-to-line voltage now available as shown in FIG. 5 is 85% of the rated voltage, or 3,542 volts. As the motor still experiences balance of the three-phase voltages, it will continue to draw balanced three-phase currents, which have a mutual-phase displacement of 120°. However, since the cell voltages no longer have a mutual-phase displacement of 120°, the angle between the cell voltage and the cell current may now vary among the phases. At light loads, when the motor current lags the motor voltage by nearly 90°, some of the cells may experience a cell current which lags the cell voltage by more than 90°. This can cause the cells to absorb energy, which they may not be able to dissipate or regenerate. Therefore, it may be desirable to avoid operation in this manner under light loads. Appropriate current or load-sensing can be implemented when light load operation of a drive utilizing this invention is desired.

FIG. 5b shows another example, where one cell has failed on Leg B (B5) and two have failed in Leg C (C4 and C5). Here the angle between A and B has been reduced to 96.9° while the angle between A and C has been reduced to 113.1°. This again gives balanced line-to-line voltages of 3249 volts, or 78% of rated.

FIG. 5c shows another examples where B4, B5, C3, C4 and C5 have all been bypassed. The adjustment still allows 51% of voltage, or 2121 volts.

The control angles required will depend on the number of functional cells remaining in each phase. The specific values for the phase-to-phase relationship can be calculated in the control as a failed condition is detected. In other instances, it may be desirable to have predetermined phase angles that represent given failure conditions. FIGS. 3, 5a, 5b and 5c show specific failure conditions. All of these examples utilize five cells per phase. It is obvious that other failed conditions can exist in the five cell per phase structure. In addition, the invention can be practiced utilizing any number of cells per phase. Once the number of cells utilized per phase in a given application is known, such as for example, five cells per leg, the fault specifics can be determined and appropriate leg-to-leg phase angle can be calculated. In lieu of calculating the specific leg-to-leg phase angle, it may desirable to have certain fault conditions programmed into the system. These may be predetermined values for given fault situations. A lookup table or tables can be utilized in practicing the invention. Tables 1–7 which follows give general values of the leg-to-leg phase relationship for power supplies utilizing anywhere from two to eight cells per leg. In these tables, the legs are assumed to be in a three-phase Y arrangement having legs A, B and C. The table has been abbreviated in that it gives the same values without regard to which cell in a given leg fails. In addition, since a failure condition in a power supply results in identical phase relationships without regard to which legs have the number of failures, a power supply with A=5, B=3 and C=5, is the same as a power supply having active cells A=5, B=5 and C=3. The table, therefore, provides an easy reduced form in which to cover all of these combinations. In the table, the A cell is always listed as having the most number of active cells, the B, second most number of active cells, and C the least number of active cells. Tables 1–7 could be used in a microprocessor scheme as lookup tables to determine the proper phase relationship in a power supply having failed cells. In the table, the term Vmax % is used to indicate the maximum voltage that would be available under a failed condition as a percentage of the normal line-to-line voltage. All of the phase angles are in relationship to the normal A vector in a power supply having no failed cells. As an example, Aø is the angle between the A leg in a failed mode as compared to the A leg in an unfailed mode. All of the angles given are in relation to the vector for the A leg in an unfailed mode. Because the examples given previously related to five cells per leg these examples can be seen in Table 4.

TABLE 1

| | | | Original number of cells = 2 | | | |
|---|---|---|---|---|---|---|
| A cells = 1 | B cells = 1 | C cells = 0 | Vmax % = 28.9 | Aø = 30.0 | Bø = 90.0 | Cø = 272.3 |
| A cells = 1 | B cells = 1 | C cells = 1 | Vmax % = 50.0 | Aø = 0.0 | Bø = 120.0 | Cø = 240.0 |
| A cells = 2 | B cells = 1 | C cells = 1 | Vmax % = 50.0 | Aø = 0.0 | Bø = 60.0 | Cø = 300.0 |
| A cells = 2 | B cells = 2 | C cells = 0 | Vmax % = 57.7 | Aø = 30.0 | Bø = 90.0 | Cø = 272.3 |
| A cells = 2 | B cells = 2 | C cells = 1 | Vmax % = 80.9 | Aø = 15.5 | Bø = 104.5 | Cø = 240.0 |
| A cells = 2 | B cells = 2 | C cells = 2 | Vmax % = 100.0 | Aø = 0.0 | Bø = 120.0 | Cø = 240.0 |

TABLE 2

| | | | Original number of cells = 3 | | | |
|---|---|---|---|---|---|---|
| A cells = 1 | B cells = 1 | C cells = 0 | Vmax % = 19.2 | Aø = 30.0 | Bø = 90.0 | Cø = 272.3 |
| A cells = 1 | B cells = 1 | C cells = 1 | Vmax % = 33.3 | Aø = 0.0 | Bø = 120.0 | Cø = 240.0 |
| A cells = 2 | B cells = 1 | C cells = 1 | Vmax % = 33.3 | Aø = 0.0 | Bø = 60.0 | Cø = 300.0 |
| A cells = 2 | B cells = 2 | C cells = 0 | Vmax % = 38.5 | Aø = 30.0 | Bø = 90.0 | Cø = 272.3 |
| A cells = 2 | B cells = 2 | C cells = 1 | Vmax % = 53.9 | Aø = 15.5 | Bø = 104.5 | Cø = 240.0 |
| A cells = 2 | B cells = 2 | C cells = 2 | Vmax % = 66.7 | Aø = 0.0 | Bø = 120.0 | Cø = 240.0 |
| A cells = 3 | B cells = 2 | C cells = 2 | Vmax % = 75.5 | Aø = 0.0 | Bø = 101.4 | Cø = 258.6 |
| A cells = 3 | B cells = 3 | C cells = 0 | Vmax % = 57.7 | Aø = 30.0 | Bø = 90.0 | Cø = 272.3 |
| A cells = 3 | B cells = 3 | C cells = 1 | Vmax % = 73.6 | Aø = 20.4 | Bø = 99.6 | Cø = 240.0 |
| A cells = 3 | B cells = 3 | C cells = 2 | Vmax % = 87.8 | Aø = 10.5 | Bø = 109.5 | Cø = 240.0 |
| A cells = 3 | B cells = 3 | C cells = 3 | Vmax % = 100.0 | Aø = 0.0 | Bø = 120.0 | Cø = 240.0 |

TABLE 3

| | | | Original number of cells = 4 | | | |
|---|---|---|---|---|---|---|
| A cells = 1 | B cells = 1 | C cells = 0 | Vmax % = 14.4 | Aø = 30.0 | Bø = 90.0 | Cø = 272.3 |
| A cells = 1 | B cells = 1 | C cells = 1 | Vmax % = 25.0 | Aø = 0.0 | Bø = 120.0 | Cø = 240.0 |
| A cells = 2 | B cells = 1 | C cells = 1 | Vmax % = 25.0 | Aø = 0.0 | Bø = 60.0 | Cø = 300.0 |
| A cells = 2 | B cells = 2 | C cells = 0 | Vmax % = 28.9 | Aø = 30.0 | Bø = 90.0 | Cø = 272.3 |
| A cells = 2 | B cells = 2 | C cells = 1 | Vmax % = 40.5 | Aø = 15.5 | Bø = 104.5 | Cø = 240.0 |
| A cells = 2 | B cells = 2 | C cells = 2 | Vmax % = 50.0 | Aø = 0.0 | Bø = 120.0 | Cø = 240.0 |
| A cells = 3 | B cells = 2 | C cells = 2 | Vmax % = 56.6 | Aø = 0.0 | Bø = 101.4 | Cø = 258.6 |
| A cells = 3 | B cells = 3 | C cells = 0 | Vmax % = 43.3 | Aø = 30.0 | Bø = 90.0 | Cø = 272.3 |
| A cells = 3 | B cells = 3 | C cells = 1 | Vmax % = 55.2 | Aø = 20.4 | Bø = 99.6 | Cø = 240.0 |
| A cells = 3 | B cells = 3 | C cells = 2 | Vmax % = 65.8 | Aø = 10.5 | Bø = 109.5 | Cø = 240.0 |
| A cells = 3 | B cells = 3 | C cells = 3 | Vmax % = 75.0 | Aø = 0.0 | Bø = 120.0 | Cø = 240.0 |
| A cells = 4 | B cells = 2 | C cells = 2 | Vmax % = 50.0 | Aø = 0.0 | Bø = 60.0 | Cø = 300.0 |
| A cells = 4 | B cells = 3 | C cells = 1 | Vmax % = 52.1 | Aø = 16.1 | Bø = 76.2 | Cø = 315.8 |
| A cells = 4 | B cells = 3 | C cells = 2 | Vmax % = 71.5 | Aø = 7.2 | Bø = 96.2 | Cø = 260.7 |
| A cells = 4 | B cells = 3 | C cells = 3 | Vmax % = 82.3 | Aø = 0.0 | Bø = 108.2 | Cø = 251.8 |
| A cells = 4 | B cells = 4 | C cells = 0 | Vmax % = 57.7 | Aø = 30.0 | Bø = 90.0 | Cø = 272.3 |
| A cells = 4 | B cells = 4 | C cells = 1 | Vmax % = 69.8 | Aø = 22.8 | Bø = 97.2 | Cø = 240.0 |
| A cells = 4 | B cells = 4 | C cells = 2 | Vmax % = 80.9 | Aø = 15.5 | Bø = 104.5 | Cø = 240.0 |
| A cells = 4 | B cells = 4 | C cells = 3 | Vmax % = 91.0 | Aø = 8.0 | Bø = 112.0 | Cø = 240.0 |
| A cells = 4 | B cells = 4 | C cells = 4 | Vmax % = 100.0 | Aø = 0.0 | Bø = 120.0 | Cø = 240.0 |

TABLE 4

| | | | Original number of cells = 5 | | | |
|---|---|---|---|---|---|---|
| A cells = 1 | B cells = 1 | C cells = 0 | Vmax % = 11.5 | Aø = 30.0 | Bø = 90.0 | Cø = 272.3 |
| A cells = 1 | B cells = 1 | C cells = 1 | Vmax % = 20.0 | Aø = 0.0 | Bø = 120.0 | Cø = 240.0 |
| A cells = 2 | B cells = 1 | C cells = 1 | Vmax % = 20.0 | Aø = 0.0 | Bø = 60.0 | Cø = 300.0 |
| A cells = 2 | B cells = 2 | C cells = 0 | Vmax % = 23.1 | Aø = 30.0 | Bø = 90.0 | Cø = 272.3 |
| A cells = 2 | B cells = 2 | C cells = 1 | Vmax % = 32.4 | Aø = 15.5 | Bø = 104.5 | Cø = 240.0 |
| A cells = 2 | B cells = 2 | C cells = 2 | Vmax % = 40.0 | Aø = 0.0 | Bø = 120.0 | Cø = 240.0 |
| A cells = 3 | B cells = 2 | C cells = 2 | Vmax % = 45.3 | Aø = 0.0 | Bø = 101.4 | Cø = 258.6 |
| A cells = 3 | B cells = 3 | C cells = 0 | Vmax % = 34.6 | Aø = 30.0 | Bø = 90.0 | Cø = 272.3 |
| A cells = 3 | B cells = 3 | C cells = 1 | Vmax % = 44.2 | Aø = 20.4 | Bø = 99.6 | Cø = 240.0 |
| A cells = 3 | B cells = 3 | C cells = 2 | Vmax % = 52.7 | Aø = 10.5 | Bø = 109.5 | Cø = 240.0 |
| A cells = 3 | B cells = 3 | C cells = 3 | Vmax % = 60.0 | Aø = 0.0 | Bø = 120.0 | Cø = 240.0 |
| A cells = 4 | B cells = 2 | C cells = 2 | Vmax % = 40.0 | Aø = 0.0 | Bø = 60.0 | Cø = 300.0 |
| A cells = 4 | B cells = 3 | C cells = 1 | Vmax % = 41.7 | Aø = 16.1 | Bø = 76.2 | Cø = 315.8 |
| A cells = 4 | B cells = 3 | C cells = 2 | Vmax % = 57.2 | Aø = 7.2 | Bø = 96.2 | Cø = 260.7 |
| A cells = 4 | B cells = 3 | C cells = 3 | Vmax % = 65.8 | Aø = 0.0 | Bø = 108.2 | Cø = 251.8 |
| A cells = 4 | B cells = 4 | C cells = 0 | Vmax % = 46.2 | Aø = 30.0 | Bø = 90.0 | Cø = 272.3 |
| A cells = 4 | B cells = 4 | C cells = 1 | Vmax % = 55.8 | Aø = 22.8 | Bø = 97.2 | Cø = 240.0 |
| A cells = 4 | B cells = 4 | C cells = 2 | Vmax % = 64.7 | Aø = 15.5 | Bø = 104.5 | Cø = 240.0 |

TABLE 4-continued

Original number of cells = 5

| | | | | | | |
|---|---|---|---|---|---|---|
| A cells = 4 | B cells = 4 | C cells = 3 | Vmax % = 72.8 | Aø = 8.0 | Bø = 112.0 | Cø = 240.0 |
| A cells = 4 | B cells = 4 | C cells = 4 | Vmax % = 80.0 | Aø = 0.0 | Bø = 120.0 | Cø = 240.0 |
| A cells = 5 | B cells = 3 | C cells = 2 | Vmax % = 51.0 | Aø = 6.5 | Bø = 67.6 | Cø = 304.9 |
| A cells = 5 | B cells = 3 | C cells = 3 | Vmax % = 69.1 | Aø = 0.0 | Bø = 93.6 | Cø = 266.4 |
| A cells = 5 | B cells = 4 | C cells = 1 | Vmax % = 53.4 | Aø = 18.9 | Bø = 79.6 | Cø = 316.1 |
| A cells = 5 | B cells = 4 | C cells = 2 | Vmax % = 69.0 | Aø = 11.6 | Bø = 93.9 | Cø = 262.1 |
| A cells = 5 | B cells = 4 | C cells = 3 | Vmax % = 78.1 | Aø = 5.9 | Bø = 102.8 | Cø = 252.8 |
| A cells = 5 | B cells = 4 | C cells = 4 | Vmax % = 86.1 | Aø = 0.0 | Bø = 111.3 | Cø = 248.7 |
| A cells = 5 | B cells = 5 | C cells = 0 | Vmax % = 57.7 | Aø = 30.0 | Bø = 90.0 | Cø = 272.3 |
| A cells = 5 | B cells = 5 | C cells = 1 | Vmax % = 67.4 | Aø = 24.3 | Bø = 95.7 | Cø = 240.0 |
| A cells = 5 | B cells = 5 | C cells = 2 | Vmax % = 76.6 | Aø = 18.5 | Bø = 101.5 | Cø = 240.0 |
| A cells = 5 | B cells = 5 | C cells = 3 | Vmax % = 85.1 | Aø = 12.5 | Bø = 107.5 | Cø = 240.0 |
| A cells = 5 | B cells = 5 | C cells = 4 | Vmax % = 92.9 | Aø = 6.4 | Bø = 113.6 | Cø = 240.0 |
| A cells = 5 | B cells = 5 | C cells = 5 | Vmax % = 100.0 | Aø = 0.0 | Bø = 120.0 | Cø = 240.0 |

TABLE 5

Original number of cells = 6

| | | | | | | |
|---|---|---|---|---|---|---|
| A cells = 1 | B cells = 1 | C cells = 0 | Vmax % = 9.6 | Aø = 30.0 | Bø = 90.0 | Cø = 272.3 |
| A cells = 1 | B cells = 1 | C cells = 1 | Vmax % = 16.7 | Aø = 0.0 | Bø = 120.0 | Cø = 240.0 |
| A cells = 2 | B cells = 1 | C cells = 1 | Vmax % = 16.7 | Aø = 0.0 | Bø = 60.0 | Cø = 300.0 |
| A cells = 2 | B cells = 2 | C cells = 0 | Vmax % = 19.2 | Aø = 30.0 | Bø = 90.0 | Cø = 272.3 |
| A cells = 2 | B cells = 2 | C cells = 1 | Vmax % = 27.0 | Aø = 15.5 | Bø = 104.5 | Cø = 240.0 |
| A cells = 2 | B cells = 2 | C cells = 2 | Vmax % = 33.3 | Aø = 0.0 | Bø = 120.0 | Cø = 240.0 |
| A cells = 3 | B cells = 2 | C cells = 2 | Vmax % = 37.7 | Aø = 0.0 | Bø = 101.4 | Cø = 258.6 |
| A cells = 3 | B cells = 3 | C cells = 0 | Vmax % = 28.9 | Aø = 30.0 | Bø = 90.0 | Cø = 272.3 |
| A cells = 3 | B cells = 3 | C cells = 1 | Vmax % = 36.8 | Aø = 20.4 | Bø = 99.6 | Cø = 240.0 |
| A cells = 3 | B cells = 3 | C cells = 2 | Vmax % = 43.9 | Aø = 10.5 | Bø = 109.5 | Cø = 240.0 |
| A cells = 3 | B cells = 3 | C cells = 3 | Vmax % = 50.0 | Aø = 0.0 | Bø = 120.0 | Cø = 240.0 |
| A cells = 4 | B cells = 2 | C cells = 2 | Vmax % = 33.3 | Aø = 0.0 | Bø = 60.0 | Cø = 300.0 |
| A cells = 4 | B cells = 3 | C cells = 1 | Vmax % = 34.7 | Aø = 16.1 | Bø = 76.2 | Cø = 315.8 |
| A cells = 4 | B cells = 3 | C cells = 2 | Vmax % = 47.7 | Aø = 7.2 | Bø = 96.2 | Cø = 260.7 |
| A cells = 4 | B cells = 3 | C cells = 3 | Vmax % = 54.9 | Aø = 0.0 | Bø = 108.2 | Cø = 251.8 |
| A cells = 4 | B cells = 4 | C cells = 0 | Vmax % = 38.5 | Aø = 30.0 | Bø = 90.0 | Cø = 272.3 |
| A cells = 4 | B cells = 4 | C cells = 1 | Vmax % = 46.5 | Aø = 22.8 | Bø = 97.2 | Cø = 240.0 |
| A cells = 4 | B cells = 4 | C cells = 2 | Vmax % = 53.9 | Aø = 15.5 | Bø = 104.5 | Cø = 240.0 |
| A cells = 4 | B cells = 4 | C cells = 3 | Vmax % = 60.7 | Aø = 8.0 | Bø = 112.0 | Cø = 240.0 |
| A cells = 4 | B cells = 4 | C cells = 4 | Vmax % = 66.7 | Aø = 0.0 | Bø = 120.0 | Cø = 240.0 |
| A cells = 5 | B cells = 3 | C cells = 2 | Vmax % = 42.5 | Aø = 6.5 | Bø = 67.6 | Cø = 304.9 |
| A cells = 5 | B cells = 3 | C cells = 3 | Vmax % = 57.6 | Aø = 0.0 | Bø = 93.6 | Cø = 266.4 |
| A cells = 5 | B cells = 4 | C cells = 1 | Vmax % = 44.5 | Aø = 18.9 | Bø = 79.6 | Cø = 316.1 |
| A cells = 5 | B cells = 4 | C cells = 2 | Vmax % = 57.5 | Aø = 11.6 | Bø = 93.9 | Cø = 262.1 |
| A cells = 5 | B cells = 4 | C cells = 3 | Vmax % = 65.1 | Aø = 5.9 | Bø = 102.8 | Cø = 252.8 |
| A cells = 5 | B cells = 4 | C cells = 4 | Vmax % = 71.7 | Aø = 0.0 | Bø = 111.3 | Cø = 248.7 |
| A cells = 5 | B cells = 5 | C cells = 0 | Vmax % = 48.1 | Aø = 30.0 | Bø = 90.0 | Cø = 272.3 |
| A cells = 5 | B cells = 5 | C cells = 1 | Vmax % = 56.2 | Aø = 24.3 | Bø = 95.7 | Cø = 240.0 |
| A cells = 5 | B cells = 5 | C cells = 2 | Vmax % = 63.8 | Aø = 18.5 | Bø = 101.5 | Cø = 240.0 |
| A cells = 5 | B cells = 5 | C cells = 3 | Vmax % = 70.9 | Aø = 12.5 | Bø = 107.5 | Cø = 240.0 |
| A cells = 5 | B cells = 5 | C cells = 4 | Vmax % = 77.4 | Aø = 6.4 | Bø = 113.6 | Cø = 240.0 |
| A cells = 5 | B cells = 5 | C cells = 5 | Vmax % = 83.3 | Aø = 0.0 | Bø = 120.0 | Cø = 240.0 |
| A cells = 6 | B cells = 3 | C cells = 3 | Vmax % = 50.0 | Aø = 0.0 | Bø = 60.0 | Cø = 300.0 |
| A cells = 6 | B cells = 4 | C cells = 3 | Vmax % = 67.3 | Aø = 4.8 | Bø = 91.2 | Cø = 268.4 |
| A cells = 6 | B cells = 4 | C cells = 4 | Vmax % = 75.5 | Aø = 0.0 | Bø = 101.4 | Cø = 258.6 |
| A cells = 6 | B cells = 5 | C cells = 1 | Vmax % = 55.1 | Aø = 20.5 | Bø = 82.4 | Cø = 311.3 |
| A cells = 6 | B cells = 5 | C cells = 2 | Vmax % = 67.2 | Aø = 14.5 | Bø = 92.7 | Cø = 263.2 |
| A cells = 6 | B cells = 5 | C cells = 3 | Vmax % = 75.1 | Aø = 9.8 | Bø = 99.8 | Cø = 253.6 |
| A cells = 6 | B cells = 5 | C cells = 4 | Vmax % = 82.1 | Aø = 5.0 | Bø = 106.5 | Cø = 249.3 |
| A cells = 6 | B cells = 5 | C cells = 5 | Vmax % = 88.5 | Aø = 0.0 | Bø = 113.1 | Cø = 246.9 |
| A cells = 6 | B cells = 6 | C cells = 0 | Vmax % = 57.7 | Aø = 30.0 | Bø = 90.0 | Cø = 272.3 |
| A cells = 6 | B cells = 6 | C cells = 1 | Vmax % = 65.9 | Aø = 25.2 | Bø = 94.8 | Cø = 240.0 |
| A cells = 6 | B cells = 6 | C cells = 2 | Vmax % = 73.6 | Aø = 20.4 | Bø = 99.6 | Cø = 240.0 |
| A cells = 6 | B cells = 6 | C cells = 3 | Vmax % = 80.9 | Aø = 15.5 | Bø = 104.5 | Cø = 240.0 |
| A cells = 6 | B cells = 6 | C cells = 4 | Vmax % = 87.8 | Aø = 10.5 | Bø = 109.5 | Cø = 240.0 |
| A cells = 6 | B cells = 6 | C cells = 5 | Vmax % = 94.1 | Aø = 5.4 | Bø = 114.6 | Cø = 240.0 |
| A cells = 6 | B cells = 6 | C cells = 6 | Vmax % = 100.0 | Aø = 0.0 | Bø = 120.0 | Cø = 240.0 |

TABLE 6

Original number of cells = 7

| | | | | | | |
|---|---|---|---|---|---|---|
| A cells = 1 | B cells = 1 | C cells = 0 | Vmax % = 8.2 | Aø = 30.0 | Bø = 90.0 | Cø = 272.3 |
| A cells = 1 | B cells = 1 | C cells = 1 | Vmax % = 14.3 | Aø = 0.0 | Bø = 120.0 | Cø = 240.0 |
| A cells = 2 | B cells = 1 | C cells = 1 | Vmax % = 14.3 | Aø = 0.0 | Bø = 60.0 | Cø = 300.0 |
| A cells = 2 | B cells = 2 | C cells = 0 | Vmax % = 16.5 | Aø = 30.0 | Bø = 90.0 | Cø = 272.3 |
| A cells = 2 | B cells = 2 | C cells = 1 | Vmax % = 23.1 | Aø = 15.5 | Bø = 104.5 | Cø = 240.0 |
| A cells = 2 | B cells = 2 | C cells = 2 | Vmax % = 28.6 | Aø = 0.0 | Bø = 120.0 | Cø = 240.0 |
| A cells = 3 | B cells = 2 | C cells = 2 | Vmax % = 32.3 | Aø = 0.0 | Bø = 101.4 | Cø = 258.6 |
| A cells = 3 | B cells = 3 | C cells = 0 | Vmax % = 24.7 | Aø = 30.0 | Bø = 90.0 | Cø = 272.3 |
| A cells = 3 | B cells = 3 | C cells = 1 | Vmax % = 31.5 | Aø = 20.4 | Bø = 99.6 | Cø = 240.0 |
| A cells = 3 | B cells = 3 | C cells = 2 | Vmax % = 37.6 | Aø = 10.5 | Bø = 109.5 | Cø = 240.0 |
| A cells = 3 | B cells = 3 | C cells = 3 | Vmax % = 42.9 | Aø = 0.0 | Bø = 120.0 | Cø = 240.0 |
| A cells = 4 | B cells = 2 | C cells = 2 | Vmax % = 28.6 | Aø = 0.0 | Bø = 60.0 | Cø = 300.0 |
| A cells = 4 | B cells = 3 | C cells = 1 | Vmax % = 29.8 | Aø = 16.1 | Bø = 76.2 | Cø = 315.8 |
| A cells = 4 | B cells = 3 | C cells = 2 | Vmax % = 40.9 | Aø = 7.2 | Bø = 96.2 | Cø = 260.7 |
| A cells = 4 | B cells = 3 | C cells = 3 | Vmax % = 47.0 | Aø = 0.0 | Bø = 108.2 | Cø = 251.8 |
| A cells = 4 | B cells = 4 | C cells = 0 | Vmax % = 33.0 | Aø = 30.0 | Bø = 90.0 | Cø = 272.3 |
| A cells = 4 | B cells = 4 | C cells = 1 | Vmax % = 39.9 | Aø = 22.8 | Bø = 97.2 | Cø = 240.0 |
| A cells = 4 | B cells = 4 | C cells = 2 | Vmax % = 46.2 | Aø = 15.5 | Bø = 104.5 | Cø = 240.0 |
| A cells = 4 | B cells = 4 | C cells = 3 | Vmax % = 52.0 | Aø = 8.0 | Bø = 112.0 | Cø = 240.0 |
| A cells = 4 | B cells = 4 | C cells = 4 | Vmax % = 57.1 | Aø = 0.0 | Bø = 120.0 | Cø = 240.0 |
| A cells = 5 | B cells = 3 | C cells = 2 | Vmax % = 36.4 | Aø = 6.5 | Bø = 67.6 | Cø = 304.9 |
| A cells = 5 | B cells = 3 | C cells = 3 | Vmax % = 49.4 | Aø = 0.0 | Bø = 93.6 | Cø = 266.4 |
| A cells = 5 | B cells = 4 | C cells = 1 | Vmax % = 38.2 | Aø = 18.9 | Bø = 79.6 | Cø = 316.1 |
| A cells = 5 | B cells = 4 | C cells = 2 | Vmax % = 49.3 | Aø = 11.6 | Bø = 93.9 | Cø = 262.1 |
| A cells = 5 | B cells = 4 | C cells = 3 | Vmax % = 55.8 | Aø = 5.9 | Bø = 102.8 | Cø = 252.8 |
| A cells = 5 | B cells = 4 | C cells = 4 | Vmax % = 61.5 | Aø = 0.0 | Bø = 111.3 | Cø = 248.7 |
| A cells = 5 | B cells = 5 | C cells = 0 | Vmax % = 41.2 | Aø = 30.0 | Bø = 90.0 | Cø = 272.3 |
| A cells = 5 | B cells = 5 | C cells = 1 | Vmax % = 48.2 | Aø = 24.3 | Bø = 95.7 | Cø = 240.0 |
| A cells = 5 | B cells = 5 | C cells = 2 | Vmax % = 54.7 | Aø = 18.5 | Bø = 101.5 | Cø = 240.0 |
| A cells = 5 | B cells = 5 | C cells = 3 | Vmax % = 60.8 | Aø = 12.5 | Bø = 107.5 | Cø = 240.0 |
| A cells = 5 | B cells = 5 | C cells = 4 | Vmax % = 66.3 | Aø = 6.4 | Bø = 113.6 | Cø = 240.0 |
| A cells = 5 | B cells = 5 | C cells = 5 | Vmax % = 71.4 | Aø = 0.0 | Bø = 120.0 | Cø = 240.0 |
| A cells = 6 | B cells = 3 | C cells = 3 | Vmax % = 42.9 | Aø = 0.0 | Bø = 60.0 | Cø = 300.0 |
| A cells = 6 | B cells = 4 | C cells = 3 | Vmax % = 57.7 | Aø = 4.8 | Bø = 91.2 | Cø = 268.4 |
| A cells = 6 | B cells = 4 | C cells = 4 | Vmax % = 64.7 | Aø = 0.0 | Bø = 101.4 | Cø = 258.6 |
| A cells = 6 | B cells = 5 | C cells = 1 | Vmax % = 47.2 | Aø = 20.5 | Bø = 82.4 | Cø = 311.3 |
| A cells = 6 | B cells = 5 | C cells = 2 | Vmax % = 57.6 | Aø = 14.5 | Bø = 92.7 | Cø = 263.2 |
| A cells = 6 | B cells = 5 | C cells = 3 | Vmax % = 64.4 | Aø = 9.8 | Bø = 99.8 | Cø = 253.6 |
| A cells = 6 | B cells = 5 | C cells = 4 | Vmax % = 70.4 | Aø = 5.0 | Bø = 106.5 | Cø = 249.3 |
| A cells = 6 | B cells = 5 | C cells = 5 | Vmax % = 75.9 | Aø = 0.0 | Bø = 113.1 | Cø = 246.9 |
| A cells = 6 | B cells = 6 | C cells = 0 | Vmax % = 49.5 | Aø = 30.0 | Bø = 90.0 | Cø = 272.3 |
| A cells = 6 | B cells = 6 | C cells = 1 | Vmax % = 56.5 | Aø = 25.2 | Bø = 94.8 | Cø = 240.0 |
| A cells = 6 | B cells = 6 | C cells = 2 | Vmax % = 63.1 | Aø = 20.4 | Bø = 99.6 | Cø = 240.0 |
| A cells = 6 | B cells = 6 | C cells = 3 | Vmax % = 69.3 | Aø = 15.5 | Bø = 104.5 | Cø = 240.0 |
| A cells = 6 | B cells = 6 | C cells = 4 | Vmax % = 75.2 | Aø = 10.5 | Bø = 109.5 | Cø = 240.0 |
| A cells = 6 | B cells = 6 | C cells = 5 | Vmax % = 80.7 | Aø = 5.4 | Bø = 114.6 | Cø = 240.0 |
| A cells = 6 | B cells = 6 | C cells = 6 | Vmax % = 85.7 | Aø = 0.0 | Bø = 120.0 | Cø = 240.0 |
| A cells = 7 | B cells = 4 | C cells = 3 | Vmax % = 52.2 | Aø = 4.6 | Bø = 68.0 | Cø = 299.9 |
| A cells = 7 | B cells = 4 | C cells = 4 | Vmax % = 66.0 | Aø = 0.0 | Bø = 89.0 | Cø = 271.0 |
| A cells = 7 | B cells = 5 | C cells = 3 | Vmax % = 66.0 | Aø = 8.2 | Bø = 90.0 | Cø = 270.0 |
| A cells = 7 | B cells = 5 | C cells = 4 | Vmax % = 73.3 | Aø = 4.1 | Bø = 98.2 | Cø = 259.7 |
| A cells = 7 | B cells = 5 | C cells = 5 | Vmax % = 79.5 | Aø = 0.0 | Bø = 105.6 | Cø = 254.4 |
| A cells = 7 | B cells = 6 | C cells = 1 | Vmax % = 54.8 | Aø = 22.1 | Bø = 83.0 | Cø = 317.0 |
| A cells = 7 | B cells = 6 | C cells = 2 | Vmax % = 65.9 | Aø = 16.6 | Bø = 92.0 | Cø = 264.0 |
| A cells = 7 | B cells = 6 | C cells = 3 | Vmax % = 72.8 | Aø = 12.6 | Bø = 97.8 | Cø = 254.2 |
| A cells = 7 | B cells = 6 | C cells = 4 | Vmax % = 79.1 | Aø = 8.6 | Bø = 103.3 | Cø = 249.8 |
| A cells = 7 | B cells = 6 | C cells = 5 | Vmax % = 84.9 | Aø = 4.4 | Bø = 108.8 | Cø = 247.3 |
| A cells = 7 | B cells = 6 | C cells = 6 | Vmax % = 90.2 | Aø = 0.0 | Bø = 114.3 | Cø = 245.7 |
| A cells = 7 | B cells = 7 | C cells = 0 | Vmax % = 57.7 | Aø = 30.0 | Bø = 90.0 | Cø = 272.3 |
| A cells = 7 | B cells = 7 | C cells = 1 | Vmax % = 64.7 | Aø = 25.9 | Bø = 94.1 | Cø = 240.0 |
| A cells = 7 | B cells = 7 | C cells = 2 | Vmax % = 71.4 | Aø = 21.8 | Bø = 98.2 | Cø = 240.0 |
| A cells = 7 | B cells = 7 | C cells = 3 | Vmax % = 77.8 | Aø = 17.6 | Bø = 102.4 | Cø = 240.0 |
| A cells = 7 | B cells = 7 | C cells = 4 | Vmax % = 83.9 | Aø = 13.4 | Bø = 106.6 | Cø = 240.0 |
| A cells = 7 | B cells = 7 | C cells = 5 | Vmax % = 89.6 | Aø = 9.1 | Bø = 110.9 | Cø = 240.0 |
| A cells = 7 | B cells = 7 | C cells = 6 | Vmax % = 95.0 | Aø = 4.6 | Bø = 115.4 | Cø = 240.0 |
| A cells = 7 | B cells = 7 | C cells = 7 | Vmax % = 100.0 | Aø = 0.0 | Bø = 120.0 | Cø = 240.0 |

TABLE 7

Original number of cells = 8

| | | | | | | |
|---|---|---|---|---|---|---|
| A cells = 1 | B cells = 1 | C cells = 0 | Vmax % = 7.2 | Aø = 30.0 | Bø = 90.0 | Cø = 272.3 |
| A cells = 1 | B cells = 1 | C cells = 1 | Vmax % = 12.5 | Aø = 0.0 | Bø = 120.0 | Cø = 240.0 |
| A cells = 2 | B cells = 1 | C cells = 1 | Vmax % = 12.5 | Aø = 0.0 | Bø = 60.0 | Cø = 300.0 |

TABLE 7-continued

Original number of cells = 8

| | | | | | | |
|---|---|---|---|---|---|---|
| A cells = 2 | B cells = 2 | C cells = 0 | Vmax % = 14.4 | Aø = 30.0 | Bø = 90.0 | Cø = 272.3 |
| A cells = 2 | B cells = 2 | C cells = 1 | Vmax % = 20.2 | Aø = 15.5 | Bø = 104.5 | Cø = 240.0 |
| A cells = 2 | B cells = 2 | C cells = 2 | Vmax % = 25.0 | Aø = 0.0 | Bø = 120.0 | Cø = 240.0 |
| A cells = 3 | B cells = 2 | C cells = 2 | Vmax % = 28.3 | Aø = 0.0 | Bø = 101.4 | Cø = 258.6 |
| A cells = 3 | B cells = 3 | C cells = 0 | Vmax % = 21.7 | Aø = 30.0 | Bø = 90.0 | Cø = 272.3 |
| A cells = 3 | B cells = 3 | C cells = 1 | Vmax % = 27.6 | Aø = 20.4 | Bø = 99.6 | Cø = 240.0 |
| A cells = 3 | B cells = 3 | C cells = 2 | Vmax % = 32.9 | Aø = 10.5 | Bø = 109.5 | Cø = 240.0 |
| A cells = 3 | B cells = 3 | C cells = 3 | Vmax % = 37.5 | Aø = 0.0 | Bø = 120.0 | Cø = 240.0 |
| A cells = 4 | B cells = 2 | C cells = 2 | Vmax % = 25.0 | Aø = 0.0 | Bø = 60.0 | Cø = 300.0 |
| A cells = 4 | B cells = 3 | C cells = 1 | Vmax % = 26.1 | Aø = 16.1 | Bø = 76.2 | Cø = 315.8 |
| A cells = 4 | B cells = 3 | C cells = 2 | Vmax % = 35.8 | Aø = 7.2 | Bø = 96.2 | Cø = 260.7 |
| A cells = 4 | B cells = 3 | C cells = 3 | Vmax % = 41.1 | Aø = 0.0 | Bø = 108.2 | Cø = 251.8 |
| A cells = 4 | B cells = 4 | C cells = 0 | Vmax % = 28.9 | Aø = 30.0 | Bø = 90.0 | Cø = 272.3 |
| A cells = 4 | B cells = 4 | C cells = 1 | Vmax % = 34.9 | Aø = 22.8 | Bø = 97.2 | Cø = 240.0 |
| A cells = 4 | B cells = 4 | C cells = 2 | Vmax % = 40.5 | Aø = 15.5 | Bø = 104.5 | Cø = 240.0 |
| A cells = 4 | B cells = 4 | C cells = 3 | Vmax % = 45.5 | Aø = 8.0 | Bø = 112.0 | Cø = 240.0 |
| A cells = 4 | B cells = 4 | C cells = 4 | Vmax % = 50.0 | Aø = 0.0 | Bø = 120.0 | Cø = 240.0 |
| A cells = 5 | B cells = 3 | C cells = 2 | Vmax % = 31.9 | Aø = 6.5 | Bø = 67.6 | Cø = 304.9 |
| A cells = 5 | B cells = 3 | C cells = 3 | Vmax % = 43.2 | Aø = 0.0 | Bø = 93.6 | Cø = 266.4 |
| A cells = 5 | B cells = 4 | C cells = 1 | Vmax % = 33.4 | Aø = 18.9 | Bø = 79.6 | Cø = 316.1 |
| A cells = 5 | B cells = 4 | C cells = 2 | Vmax % = 43.1 | Aø = 11.6 | Bø = 93.9 | Cø = 262.1 |
| A cells = 5 | B cells = 4 | C cells = 3 | Vmax % = 48.8 | Aø = 5.9 | Bø = 102.8 | Cø = 252.8 |
| A cells = 5 | B cells = 4 | C cells = 4 | Vmax % = 53.8 | Aø = 0.0 | Bø = 111.3 | Cø = 248.7 |
| A cells = 5 | B cells = 5 | C cells = 0 | Vmax % = 36.1 | Aø = 30.0 | Bø = 90.0 | Cø = 272.3 |
| A cells = 5 | B cells = 5 | C cells = 1 | Vmax % = 42.2 | Aø = 24.3 | Bø = 95.7 | Cø = 240.0 |
| A cells = 5 | B cells = 5 | C cells = 2 | Vmax % = 47.9 | Aø = 18.5 | Bø = 101.5 | Cø = 240.0 |
| A cells = 5 | B cells = 5 | C cells = 3 | Vmax % = 53.2 | Aø = 12.5 | Bø = 107.5 | Cø = 240.0 |
| A cells = 5 | B cells = 5 | C cells = 4 | Vmax % = 58.0 | Aø = 6.4 | Bø = 113.6 | Cø = 240.0 |
| A cells = 5 | B cells = 5 | C cells = 5 | Vmax % = 62.5 | Aø = 0.0 | Bø = 120.0 | Cø = 240.0 |
| A cells = 6 | B cells = 3 | C cells = 3 | Vmax % = 37.5 | Aø = 0.0 | Bø = 60.0 | Cø = 300.0 |
| A cells = 6 | B cells = 4 | C cells = 3 | Vmax % = 50.5 | Aø = 4.8 | Bø = 91.2 | Cø = 268.4 |
| A cells = 6 | B cells = 4 | C cells = 4 | Vmax % = 56.6 | Aø = 0.0 | Bø = 101.4 | Cø = 258.6 |
| A cells = 6 | B cells = 5 | C cells = 1 | Vmax % = 41.3 | Aø = 20.5 | Bø = 82.4 | Cø = 311.3 |
| A cells = 6 | B cells = 5 | C cells = 2 | Vmax % = 50.4 | Aø = 14.5 | Bø = 92.7 | Cø = 263.2 |
| A cells = 6 | B cells = 5 | C cells = 3 | Vmax % = 56.3 | Aø = 9.8 | Bø = 99.8 | Cø = 253.6 |
| A cells = 6 | B cells = 5 | C cells = 4 | Vmax % = 61.6 | Aø = 5.0 | Bø = 106.5 | Cø = 249.3 |
| A cells = 6 | B cells = 5 | C cells = 5 | Vmax % = 66.4 | Aø = 0.0 | Bø = 113.1 | Cø = 246.9 |
| A cells = 6 | B cells = 6 | C cells = 0 | Vmax % = 43.3 | Aø = 30.0 | Bø = 90.0 | Cø = 272.3 |
| A cells = 6 | B cells = 6 | C cells = 1 | Vmax % = 49.4 | Aø = 25.2 | Bø = 94.8 | Cø = 240.0 |
| A cells = 6 | B cells = 6 | C cells = 2 | Vmax % = 55.2 | Aø = 20.4 | Bø = 99.6 | Cø = 240.0 |
| A cells = 6 | B cells = 6 | C cells = 3 | Vmax % = 60.7 | Aø = 15.5 | Bø = 104.5 | Cø = 240.0 |
| A cells = 6 | B cells = 6 | C cells = 4 | Vmax % = 65.8 | Aø = 10.5 | Bø = 109.5 | Cø = 240.0 |
| A cells = 6 | B cells = 6 | C cells = 5 | Vmax % = 70.6 | Aø = 5.4 | Bø = 114.6 | Cø = 240.0 |
| A cells = 6 | B cells = 6 | C cells = 6 | Vmax % = 75.0 | Aø = 0.0 | Bø = 120.0 | Cø = 240.0 |
| A cells = 7 | B cells = 4 | C cells = 3 | Vmax % = 45.6 | Aø = 4.6 | Bø = 68.0 | Cø = 299.9 |
| A cells = 7 | B cells = 4 | C cells = 4 | Vmax % = 57.7 | Aø = 0.0 | Bø = 89.0 | Cø = 271.0 |
| A cells = 7 | B cells = 5 | C cells = 3 | Vmax % = 57.7 | Aø = 8.2 | Bø = 90.0 | Cø = 270.0 |
| A cells = 7 | B cells = 5 | C cells = 4 | Vmax % = 64.1 | Aø = 4.1 | Bø = 98.2 | Cø = 259.7 |
| A cells = 7 | B cells = 5 | C cells = 5 | Vmax % = 69.5 | Aø = 0.0 | Bø = 105.6 | Cø = 254.4 |
| A cells = 7 | B cells = 6 | C cells = 1 | Vmax % = 47.9 | Aø = 22.1 | Bø = 83.0 | Cø = 317.0 |
| A cells = 7 | B cells = 6 | C cells = 2 | Vmax % = 57.6 | Aø = 16.6 | Bø = 92.0 | Cø = 264.0 |
| A cells = 7 | B cells = 6 | C cells = 3 | Vmax % = 63.7 | Aø = 12.6 | Bø = 97.8 | Cø = 254.2 |
| A cells = 7 | B cells = 6 | C cells = 4 | Vmax % = 69.2 | Aø = 8.6 | Bø = 103.3 | Cø = 249.8 |
| A cells = 7 | B cells = 6 | C cells = 5 | Vmax % = 74.3 | Aø = 4.4 | Bø = 108.8 | Cø = 247.3 |
| A cells = 7 | B cells = 6 | C cells = 6 | Vmax % = 78.9 | Aø = 0.0 | Bø = 114.3 | Cø = 245.7 |
| A cells = 7 | B cells = 7 | C cells = 0 | Vmax % = 50.5 | Aø = 30.0 | Bø = 90.0 | Cø = 272.3 |
| A cells = 7 | B cells = 7 | C cells = 1 | Vmax % = 56.6 | Aø = 25.9 | Bø = 94.1 | Cø = 240.0 |
| A cells = 7 | B cells = 7 | C cells = 2 | Vmax % = 62.5 | Aø = 21.8 | Bø = 98.2 | Cø = 240.0 |
| A cells = 7 | B cells = 7 | C cells = 3 | Vmax % = 68.1 | Aø = 17.6 | Bø = 102.4 | Cø = 240.0 |
| A cells = 7 | B cells = 7 | C cells = 4 | Vmax % = 73.4 | Aø = 13.4 | Bø = 106.6 | Cø = 240.0 |
| A cells = 7 | B cells = 7 | C cells = 5 | Vmax % = 78.4 | Aø = 9.1 | Bø = 110.9 | Cø = 240.0 |
| A cells = 7 | B cells = 7 | C cells = 6 | Vmax % = 83.1 | Aø = 4.6 | Bø = 115.4 | Cø = 240.0 |
| A cells = 7 | B cells = 7 | C cells = 7 | Vmax % = 87.5 | Aø = 0.0 | Bø = 120.0 | Cø = 240.0 |
| A cells = 8 | B cells = 4 | C cells = 4 | Vmax % = 50.0 | Aø = 0.0 | Bø = 60.0 | Cø = 300.0 |
| A cells = 8 | B cells = 5 | C cells = 3 | Vmax % = 50.7 | Aø = 8.2 | Bø = 68.4 | Cø = 307.8 |
| A cells = 8 | B cells = 5 | C cells = 4 | Vmax % = 64.9 | Aø = 3.6 | Bø = 87.7 | Cø = 272.8 |
| A cells = 8 | B cells = 6 | C cells = 2 | Vmax % = 52.1 | Aø = 16.1 | Bø = 76.2 | Cø = 315.8 |
| A cells = 8 | B cells = 6 | C cells = 3 | Vmax % = 64.9 | Aø = 10.8 | Bø = 89.4 | Cø = 271.2 |
| A cells = 8 | B cells = 6 | C cells = 4 | Vmax % = 71.5 | Aø = 7.2 | Bø = 96.2 | Cø = 260.7 |
| A cells = 8 | B cells = 6 | C cells = 5 | Vmax % = 77.2 | Aø = 3.7 | Bø = 102.3 | Cø = 255.2 |
| A cells = 8 | B cells = 6 | C cells = 6 | Vmax % = 82.3 | Aø = 0.0 | Bø = 108.2 | Cø = 251.8 |
| A cells = 8 | B cells = 7 | C cells = 1 | Vmax % = 55.4 | Aø = 23.1 | Bø = 84.2 | Cø = 315.3 |
| A cells = 8 | B cells = 7 | C cells = 2 | Vmax % = 64.9 | Aø = 18.2 | Bø = 91.5 | Cø = 264.7 |
| A cells = 8 | B cells = 7 | C cells = 3 | Vmax % = 71.1 | Aø = 14.7 | Bø = 96.5 | Cø = 254.7 |
| A cells = 8 | B cells = 7 | C cells = 4 | Vmax % = 76.7 | Aø = 11.2 | Bø = 101.2 | Cø = 250.2 |
| A cells = 8 | B cells = 7 | C cells = 5 | Vmax % = 82.0 | Aø = 7.6 | Bø = 105.8 | Cø = 247.6 |
| A cells = 8 | B cells = 7 | C cells = 6 | Vmax % = 86.9 | Aø = 3.9 | Bø = 110.4 | Cø = 246.0 |

TABLE 7-continued

Original number of cells = 8

| | | | | | | |
|---|---|---|---|---|---|---|
| A cells = 8 | B cells = 7 | C cells = 7 | Vmax % = 91.5 | Aø = 0.0 | Bø = 115.2 | Cø = 244.9 |
| A cells = 8 | B cells = 8 | C cells = 0 | Vmax % = 57.7 | Aø = 30.0 | Bø = 90.0 | Cø = 272.3 |
| A cells = 8 | B cells = 8 | C cells = 2 | Vmax % = 69.8 | Aø = 22.8 | Bø = 97.2 | Cø = 240.0 |
| A cells = 8 | B cells = 8 | C cells = 3 | Vmax % = 75.5 | Aø = 19.2 | Bø = 100.8 | Cø = 240.0 |
| A cells = 8 | B cells = 8 | C cells = 4 | Vmax % = 80.9 | Aø = 15.5 | Bø = 104.5 | Cø = 240.0 |
| A cells = 8 | B cells = 8 | C cells = 5 | Vmax % = 86.1 | Aø = 11.8 | Bø = 108.2 | Cø = 240.0 |
| A cells = 8 | B cells = 8 | C cells = 6 | Vmax % = 91.0 | Aø = 8.0 | Bø = 112.0 | Cø = 240.0 |
| A cells = 8 | B cells = 8 | C cells = 7 | Vmax % = 95.7 | Aø = 4.1 | Bø = 115.9 | Cø = 240.0 |
| A cells = 8 | B cells = 8 | C cells = 8 | Vmax % = 100.0 | Aø = 0.0 | Bø = 120.0 | Cø = 240.0 |

Figure 6:
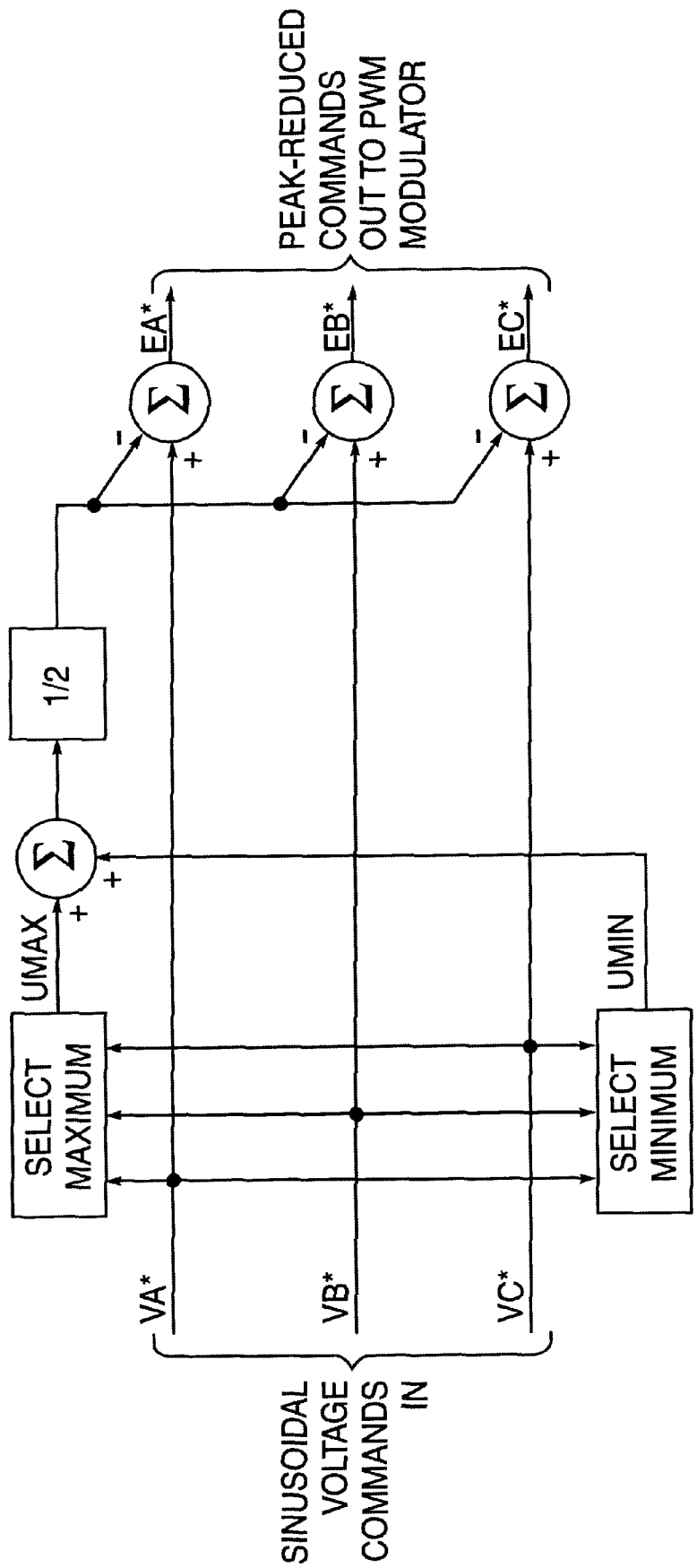
FIG. 6 shows a diagram of a prior art control function to reduce the peak voltage commands to a three-phase supply.

The angles given in Tables 1–7 give the optimum results, but the angles may be fairly difficult to calculate, especially when the number of functional cells is different in all three phases. However, utilizing other teachings of this invention, it is not necessary to calculate these angles. An existing control structure can be modified to implement a balanced bypass control, with results almost as good as Tables 1–7. Output voltage of the individual cells in each leg is controlled by pulse-width modulation. This modulation is implemented as shown in FIG. 1c by comparing command waveforms for each phase or leg to a group of triangular carrier waveforms. The carrier waveforms oscillate at the desired switching frequency for the cells. These carrier waveforms have various phase angles to obtain harmonic cancellation between the cells. The command waveforms are simply replicas of the desired output voltages from point N to points A, B and C, namely the individual legs A, B and C. When the array of cells is used to drive a load such as a motor, the desired line-to-line output voltages are typically sinusoidal in nature. However, if sinusoidal command waveforms are employed, then the maximum available output voltage will be limited to the value where the sine wave amplitude becomes equal to the carrier amplitude. With three-phase sine waves, at the moment when one phase reaches maximum voltage, the other two phases are only at half of the maximum voltage with opposite polarity. This results in unused capacity. To improve the maximum voltage limit, a control method such as shown in FIG. 6 is often used. The original sinusoidal commands, $V_A^*$, $V_B^*$, $VC^*$, are processed as shown in the block diagram of FIG. 6. Output of this process is then sent to the pulse-width modulator.

Shown in FIG. 6 (prior art), a block labeled SELECT MAXIMUM produces a signal equal to the most positive of the three voltage commands at any instant. A similar block labeled SELECT MINIMUM produces a signal equal to the most negative of the three voltage commands at any instant. These two signals are added, and the sum is divided in half. The resulting signal is then subtracted from each of the original voltage commands, to produce a new set of voltage commands which are then sent to the pulse-width modulator. Modified voltage commands EA*, EB* and EC* are peak-reduced commands that are sent to the PWM control. For example, if the magnitude of the most positive voltage command is equal to the most negative, the output of the sum will be zero. However, if the magnitude of the most positive voltage command is greater than the most negative, the output of the sum will be positive. When half of this difference is subtracted from all three commands, the resulting new command set, EA*, EB*, EC*, will have most positive and most negative values of equal size. As shown in FIG. 6, the peak voltage reduction method subtracts the same signal from all three commands. Such a signal is called a "common mode signal." The polarity of the subtraction is always such that the command with the largest magnitude is reduced, while the magnitude of the one or both of the other commands is increased. In effect, the phases which have extra capacity are used to "help" the phase with the greatest burden. This methodology increases the available line-to-line voltage by 20% over the sinusoidal case. It can also be used with the failed cell bypass invention, with a simple modification.

Figure 7:
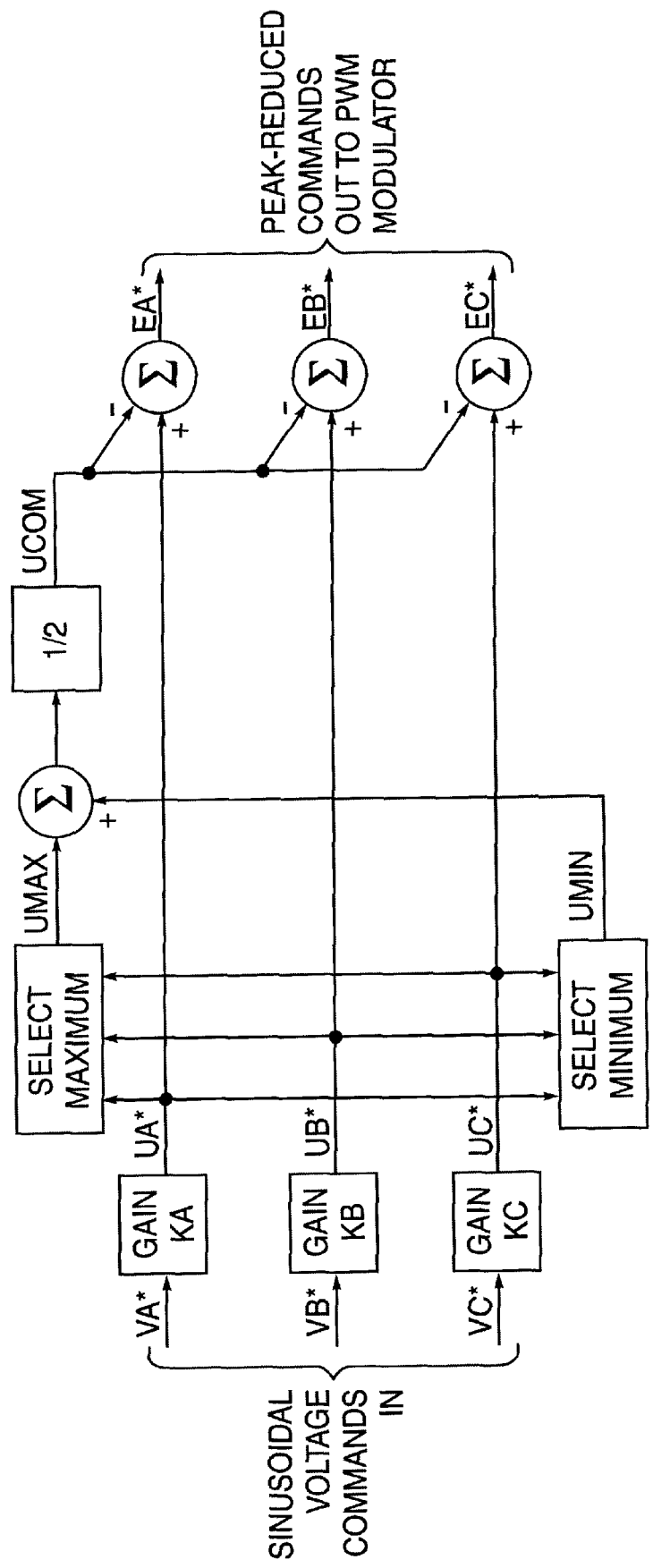
FIG. 7 shows a block diagram of a control function to reduce peak voltage and to optimize the output voltage during operation with failed converter cells.
Figure 8C:
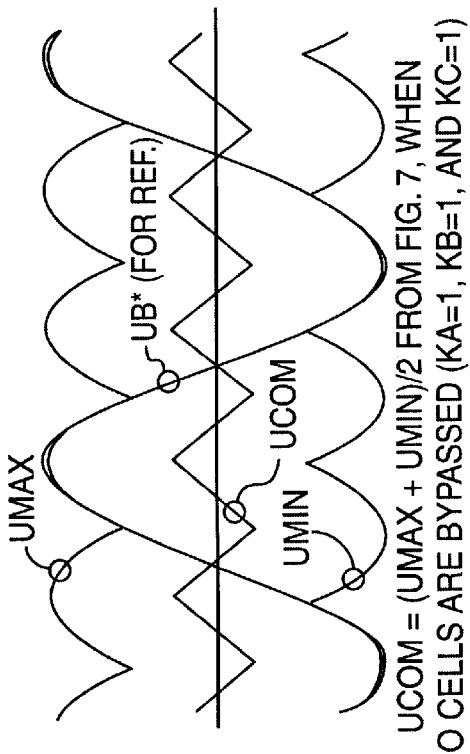
FIGS. 8a, b, c and d are diagrams showing control signal waveforms under various operating conditions.
Figure 8D:
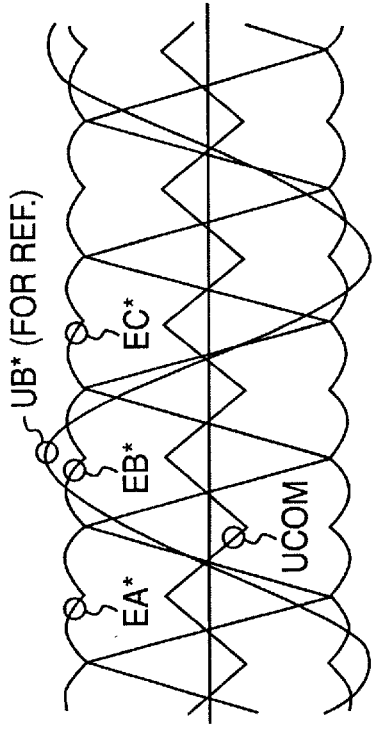
Figure 8A:
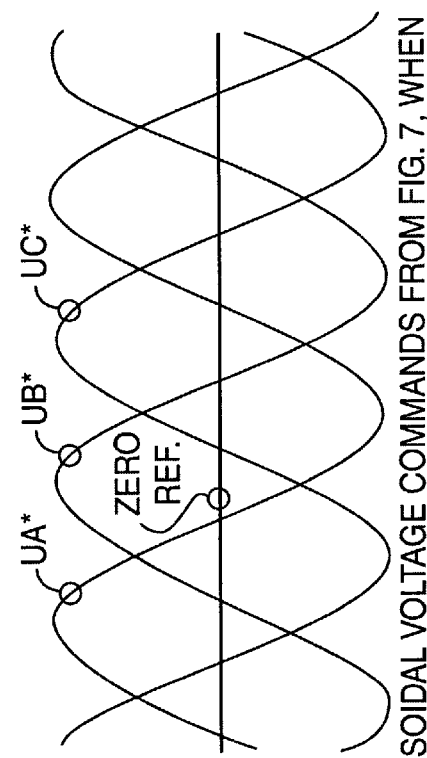
Figure 8B:
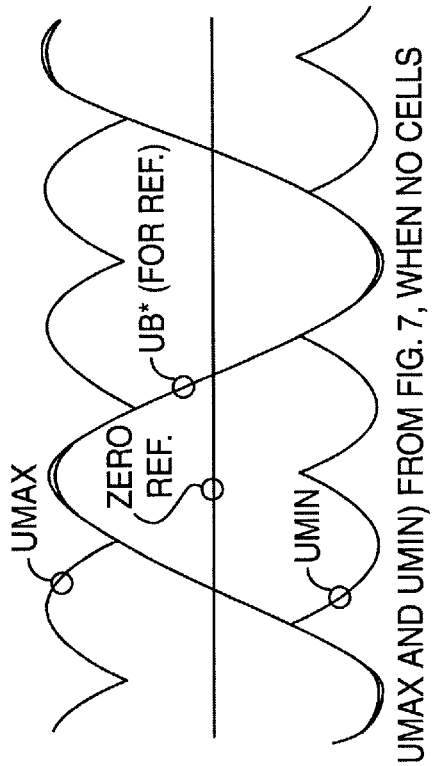
Figure 9A:
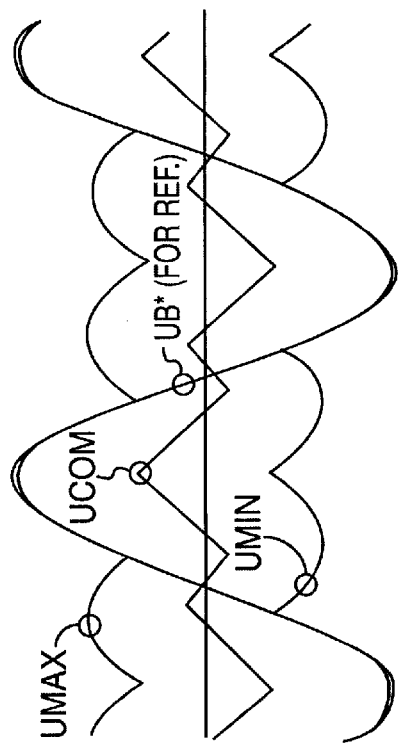
FIGS. 9a, b, c and d are signal waveforms of some embodiments.
Figure 9B:
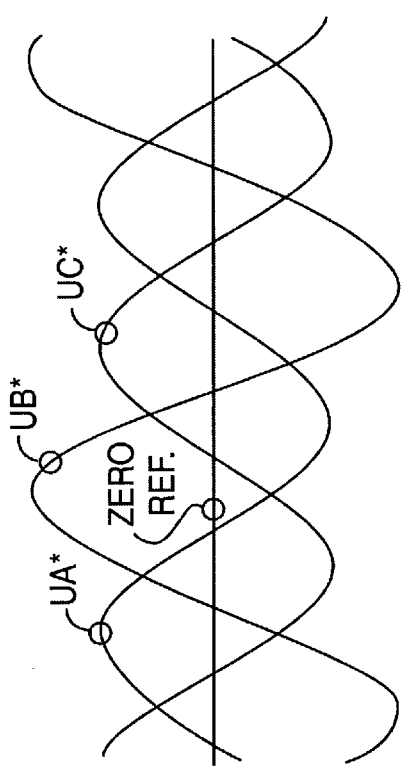
Figure 9C:
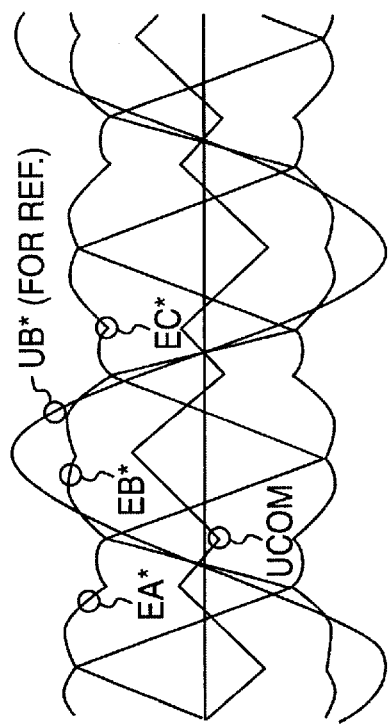
Figure 9D:
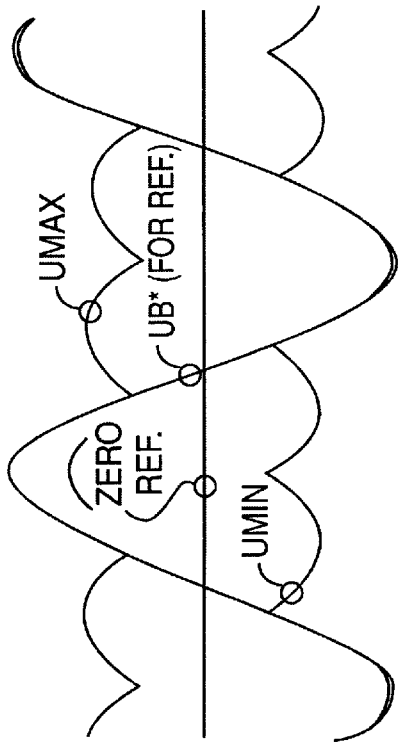

The peak voltage reduction method of FIG. 6 can be modified to also implement the new bypass invention methodology. FIG. 7 shows a very simple modification. The only change needed to the FIG. 6 diagram is to introduce adjustable gains KA, KB and KC to the sinusoidal input commands $V_A^*$, $V_B^*$ and VC*. These new gains are normally unity if no cells are bypassed. In that way they have no effect on the output values EA*, EB* and EC*. However, if one or more cells are bypassed, then the values of these gains for any phase, where the number of functional cells has been reduced, is increased to the ratio of the normal cell count divided by the actual unfailed cell count The result is to tend to increase the command to the remaining cells by the amount needed to maintain the original output voltage. Gain function blocks KA, KB and KC provide this function. Since this new command is larger than the commands to the other phases, which have lost fewer or no cells, a common-mode signal is generated which then reduces the burden on the remaining cells and causes the cells in the other phase to "help" supply voltage to the phase or phases having legs with failed cells.

FIGS. 8, 9, and 10 show waveforms from FIG. 7 with zero, two, and four cells bypassed, respectively. Shown in FIG. 8, the gains for the respective legs KA, KB, and KC, are equal to one, as no cells have failed. In FIG. 7 the signals marked $V_A^*$, $V_B^*$, and VC* are the balanced sinusoidal voltage commands originating in other parts of the control. These signals are multiplied by gains KA, KB, and KC respectively to generate signals UA*, UB*, and UC*. FIG. 8 shows the case of no cells bypassed as in FIG. 2 (so that KA=1, KB=1, and KC=1); therefore in FIG. 8a UA*, UB*, and UC* are also balanced sinusoidal voltages. Note that at the instant when UB* reaches its peak positive value, both UA* and UC* are negative, but with only half the magnitude of UB*. FIG. 8b shows the signal UMAX from the SELECT MAXIMUM block, and also the signal UMIN from the SELECT MINIMUM block. In FIG. 8b only UB* has been shown for clarity; both UA* and UC* have been omitted. It is clear that the UMAX signal follows whichever of the signals UA*, UB* or UC* is the most positive, while the UMIN signal follows whichever of the signals UA*, UB* or UC* is the most negative. FIG. 8c is the same as 8b, with the signal UCOM added. UCOM is the result of adding together UMAX and UMIN, and dividing by two. UCOM is the common-mode signal that will be subtracted from the three signals UA*, UB*, and UC*. FIG. 8d shows the result of that subtraction, where EA*=UA*−UCOM, EB*=UB*−UCOM, and EC*=UC*−UCOM. Note that these three signals have lower peak values than UB* (or UA* or UC*, which are not shown). At the instant when UB* reaches its peak positive value, EB* has a smaller positive value; and both EA* and EC* are negative with the same magnitude as EB*. When EA*, EB*, and EC* are used to control the PWM modulation of the cells; the effect at that instant will be to reduce the peak voltage magnitude required from the B-phase cells by increasing the magnitude required from the A-phase and C-phase cells.

However, in FIG. 9 cells B4 and B5 have been bypassed. The waveforms in FIG. 9 correspond to the outputs from FIG. 7 with cells B4 and B5 bypassed. FIG. 9 shows the same signals as FIG. 8 for the case of two cells bypassed in phase B (as in FIG. 3). The signals $V_A^*$, $V_B^*$, and VC* are still balanced, but the gain KB has been increased to equal the ratio of the normal cell count divided by the remaining un-bypassed cell count, which is 5/3=1.67. The other gains are unaffected, so that KA=1, KB=1.67, and KC=1. Therefore in FIG. 9a UA* and UC* are balanced sinusoidal voltages but UB* is much larger. FIG. 9b shows the signal UMAX from the SELECT MAXIMUM block, and also the signal UMIN from the SELECT MINIMUM block under these conditions (UA* and UC* have been omitted for clarity). FIG. 9c is the same as 9b, with the signal UCOM added. UCOM now contains a significant component of the UB* signal, due to the unbalance. FIG. 9d shows the result of subtracting UCOM from UA*, UB* and UC* to get EA*, EB* and EC*. Note that these three signals have peak values lower than UB*, and that they all have the same peak values at different moments within each cycle. At the instant when UB* reaches its peak positive value, EB* has a significantly smaller positive value; and both EA* and EC* are negative with the same magnitude as EB*. When EA*, EB*, and EC* are used to control the PWM modulation of the cells; the effect is that all the remaining cells will be required to produce the same peak voltage, even though phase B is missing two out of five cells. If the drive output voltage is gradually increased, all 13 remaining cells will reach their voltage limit simultaneously. This will occur at about 85% of the voltage available when all 15 cells were functioning. However, if two cells had been bypassed in each phase (as shown in FIG. 4), the maximum available voltage would be only 60%.

The voltage diagram of the power circuit for such a bypass arrangement is shown in FIG. 5. Hence, in this example, two cells have been bypassed in leg B, the constant $k_A$ has been increased from the previous value of 1 to the current value of 1.67. This value may be calculated from the following equation:

$$k_x = \frac{\text{the total number of cells in leg } X}{\text{the number of nonbypassed cells in leg } X}$$

Figure 10A:
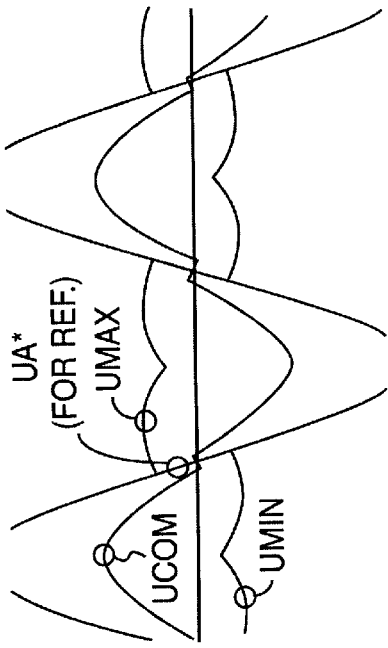
FIGS. 10a, b, c and d are control waveforms of some embodiments.
Figure 10B:
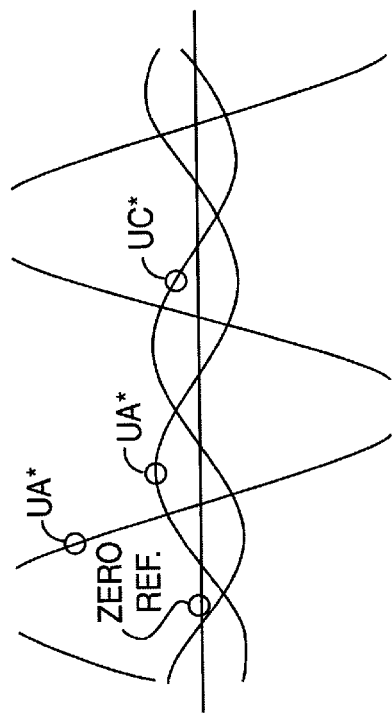
Figure 10C:
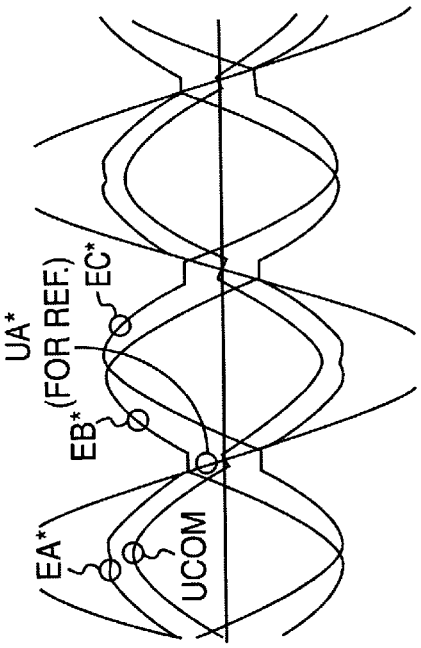
Figure 10D:
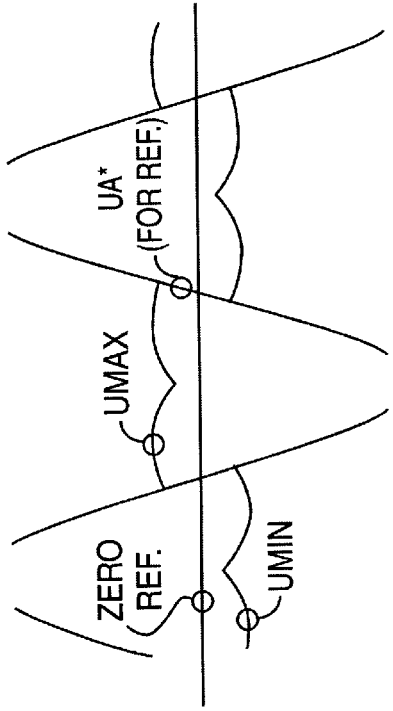

The total number of the cells in the leg includes those that are bypassed and those that are not bypassed. As shown in the example, $k_A$=5/3 or 1.67. FIG. 10 shows the waveforms from FIG. 7, having command outputs to the pulse-width modulation control, EA*, EB* and EC*. In this example cells $A_2$, $A_3$, $A_4$ and $A_5$ have been bypassed. FIG. 10 shows the same signals as FIG. 8 for the case of four cells bypassed in phase A. The signals $V_A^*$, $V_B^*$, and VC* are still balanced, but the gain KB has been increased to equal the ratio of the normal cell count divided by the remaining un-bypassed cell count, which is 5/1=5. The other gains are unaffected, so that KA=5, KB=1, and KC=1. Therefore in FIG. 10a UB* and UC* are balanced sinusoidal voltages but UA* is much larger. FIG. 10b shows the signal UMAX from the SELECT MAXIMUM block, and also the signal UMIN from the SELECT MINIMUM block under these conditions (UB* and UC* have been omitted for clarity). FIG. 10c is the same as 10b, with the signal UCOM added. UCOM now contains a dominant component of the UA* signal, due to the unbalance. FIG. 10d shows the result of subtracting UCOM from UA*, UB* and UC* to get EA*, EB* and EC*. Note that these three signals have peak values lower than UAB*, and that they all have the same peak values at different moments within each cycle. At the instant when UA* reaches its peak positive value, EA* has a significantly smaller positive value; and both EB* and EC* are negative with the same magnitude as EA*. When EA*, EB*, and EC* are used to control the PWM modulation of the cells; the effect is that all the remaining cells will be required to produce the same peak voltage, even though phase A is missing four out of five cells. If the drive output voltage is gradually increased, all 11 remaining cells will reach their voltage limit simultaneously. This will occur at about 67% of the voltage available when all 15 cells were functioning. However, if four cells had been bypassed in each, the maximum available voltage would be only 20%.

This results in new gain constants to the input of FIG. 7. These new constants are KA=5, KB=1 and KC=1. As previously discussed, since there are no failures in leg B or leg C, the constant is unity. This is derived by the total number of cells in each leg divided by the number of cells which are operational and have not been bypassed. In each instance with regard to legs B and C, the values are 5/5. However, because leg A has cells A2, A3, A4 and A5 bypassed, the value for $k_A$ is equal to 5; the total number of cells in the leg, divided by the number of cells that are operational, namely 1. The result is the constant $k_A$=5. Revising these values of kA, kB and kC, the circuit of FIG. 1a can be operated with four power cells failed in a single leg and still maintain balanced output voltage to motor terminals A, B and C. Seventy-three percent of the operational power cells or converters, namely $A_1$, $B_{1-5}$ and $C_{1-5}$ are providing power to the motor. In such an operation if the practice of shunting or bypassing an equal number of functional cells was utilized, the maximum output voltage would be 20% between motor terminals. However, utilizing the present invention, the output voltage between the terminals of the motor in a system having four failed cells in a single leg is equal to 67%.

Figure 11:
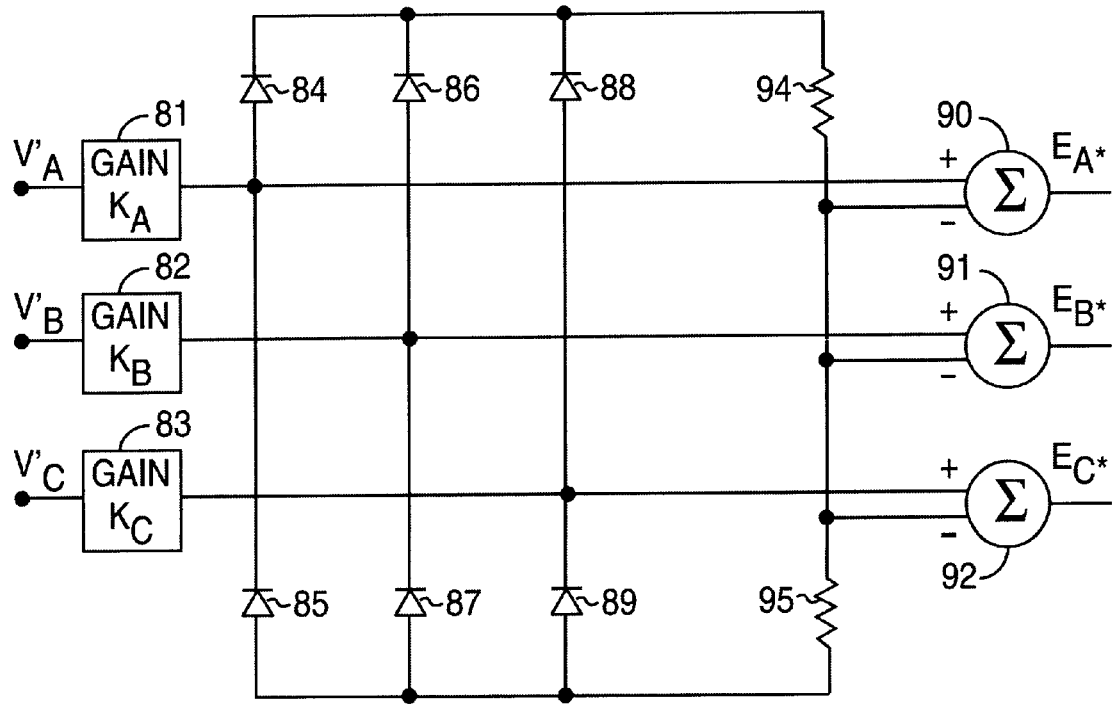
FIG. 11 is a circuit diagram of an embodiment of FIG. 7.

FIG. 11 shows a circuit diagram which can be used to provide the modified pulse-width modulation signals EA*, EB* and EC*. Inputs $V_A"$, $V_B"$ and $V_C"$ are fed through gain controls 81–83, which represent the cell failure constants kA, kB and kC. The select minimum-select maximum circuitry utilizes a diode-bridge, having diodes 84, 86 and 88 feeding the select maximum. Similarly, diodes 85, 87 and 89 provide voltage feeds for the select minimum function. Voltage divider circuits utilizing resistors 94 and 95 provide the division-by-two function. The voltage divided-by-two function is then fed to summers 90, 91 and 92, along with the respective gain modified control signal values.

The method of FIGS. 7 or 11 almost achieves the same output voltages as using calculated angles from Tables 1–7, but it does introduce small amounts of distortion which will often be acceptable. Since the method of FIG. 7 is simple, with no feedback loops, it may be preferred in some cases.

Figure 12:
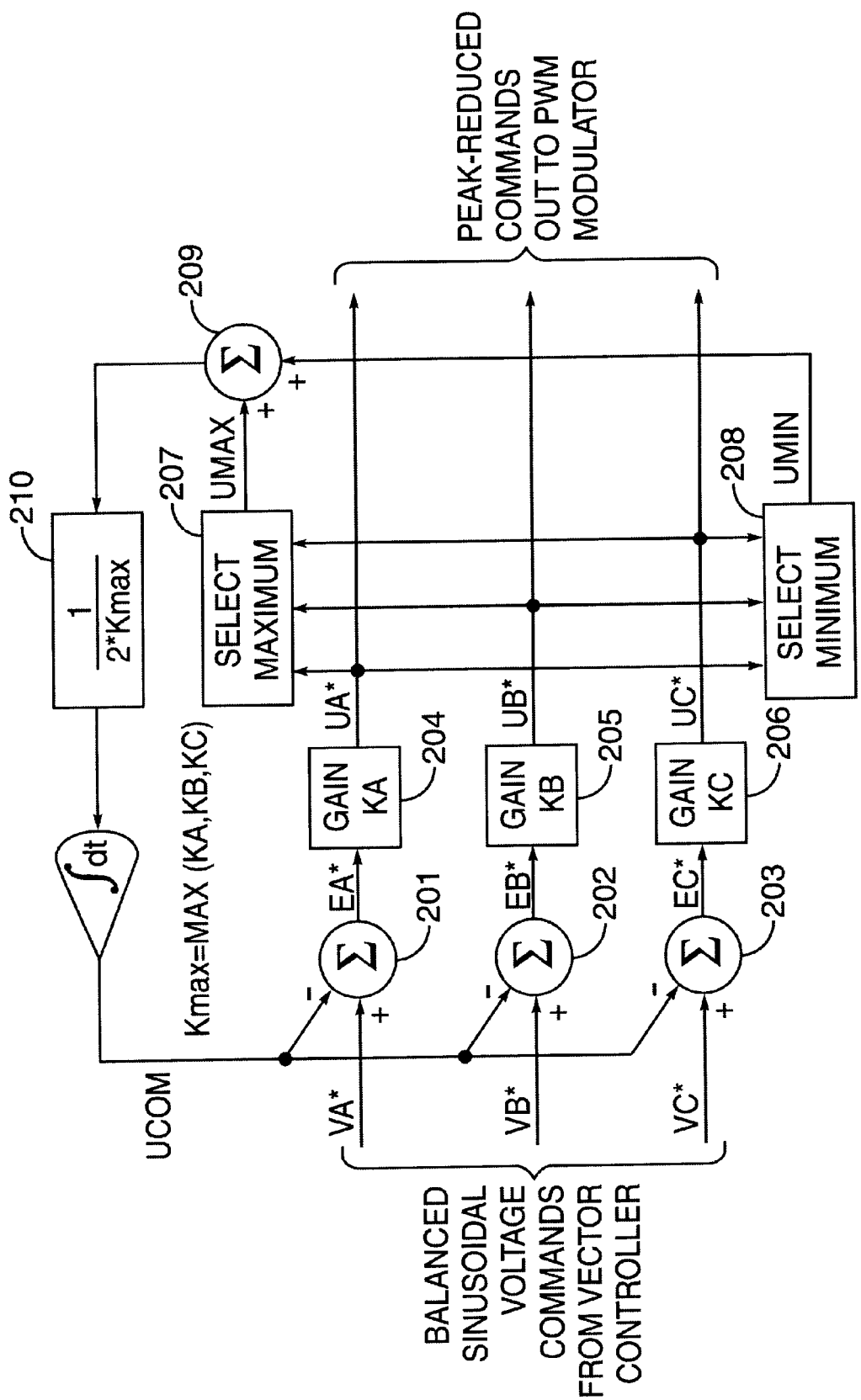
FIG. 12 shows a block diagram of a second improved control function to reduce peak voltage and optimize the output voltage during operation with failed converter cells.

FIG. 12 shows a block diagram of another control function to reduce the peak voltage command, and also to implement the new strategy, which is more complex than FIG. 7 but gives better results. This method requires an internal feedback loop with integration, but it avoids the distortion of FIG. 7 and comes even closer to achieving the same output voltages as using the calculated angles of Table 7.

The principle difference between FIG. 7 and FIG. 12 is that the common-mode signal UCOM is subtracted from the sinusoidal commands VA*, VB* and VC* before the adjustable gains KA, KB, and KC are applied. The subtraction occurs in the summation functions 201, 202, and 203, while the gains are applied in blocks 204, 205, and 206. As in FIG. 7, block 207 SELECT MAXIMUM produces a signal UMAX equal to the most positive input signal, but these input signals are now the outputs UA*, UB* and UC*. Similarly, block 208 SELECT MINIMUM produces a signal UMIN equal to the most negative input signal, but these input signals are again the outputs UA*, UB*, and UC*.

The signals UMAX and UMIN are added in summation function 209, and divided in half in block 210. In block 210 the signal is also divided by Kmax, which is equal to the largest of the three gains KA, KB, or KC. Division by Kmax is needed for stability in digital implementations with sampling, but is not needed in analog implementations. The output of block 210 is integrated with respect to time in function 211 to produce signal UCOM.

During operation of the method of FIG. 12, suppose that the most positive signal UMAX exceeds the amplitude of the most negative signal UMIN; so that a small positive remnant emerges from block 209 to drive the integrator 211 via gain block 210. This will cause the integrator output UCOM to become more positive over time. When this more positive signal UCOM is subtracted from VA*, VB*, and VC* in 201, 202, and 203, it will cause signals UA*, UB*, and UC* to become more negative. This process will continue until UMAX and UMIN are equal but opposite, so that the summation output 209 becomes zero. At this point the most positive and most negative signals are equal but opposite, as desired.

The method of FIG. 12 is slightly superior to FIG. 7 because it does not introduce distortion and allows slightly higher output voltage. However, it is more complex due to the feedback path with integration. Feedback is necessary because the common-mode signal UCOM is derived downstream of the point where it is used. Therefore in many cases the method of FIG. 7 will be preferred.

Figure 13:
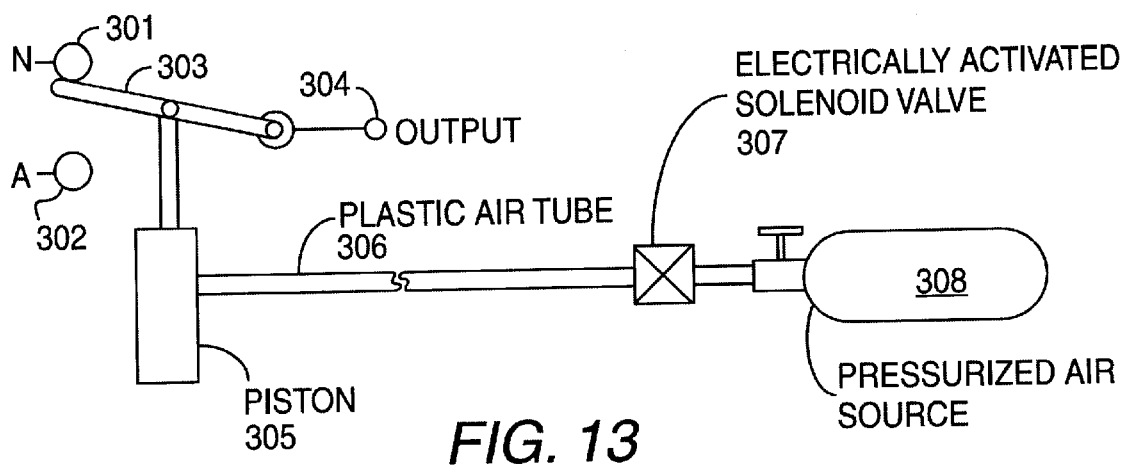
FIG. 13 is a diagram of a pneumatically operated transfer switch.

While many of the various embodiments discussed hereinto before have utilized bypass functions such as described in FIG. 1D, it is understood that other arrangements may be utilized to transfer the outputs from various operating cells. FIG. 13 shows one such transfer switch. In this diagrammatic representation a normal input at 301 can be connected to the output 304 via switch arm 303. In the alternative position, 303 can connect the output 304 to an alternate input 302. This-SPDT switching arrangement is well-known to those in the electrical arts. As shown the switch arm 303 is driven by a fluid-operated piston 305 which can be supplied through a tube 306. In the preferred embodiments the fluid would be air and the tube 306 could be of a plastic, non-electrical conducting material. Such materials are readily available. 308 shows a source of pressurized air. This could be a captive reservoir or a compressor or other source of pressurized fluid. Electrical operation of solenoid valve 307 causes switch arm 303 to move. In this arrangement a transfer switch is used in lieu of the bypass contactors shown in FIG. 1d. One of the advantages of such an arrangement is that the mechanical contactor can be mounted adjacent to the high voltage connection areas and electrical isolation is maintained by the non-conducting tube 306. As a result, all high voltage would be maintained in the high voltage area. Electrically operated solenoid valve 307 could be a two-position valve in which fluid from 308 is communicated to piston 305 in one position and fluid from operating piston 305 is exhausted to atmosphere and source 308 is cut off in the alternative position.

The use of a single-pole double-throw transfer switch provides for continuity in drives having a cell failure. In addition use of the single-pole double-throw transfer switch allows for the elimination of the bypass fuse needed in the single-throw bypass scheme. That fuse is needed for the possibility that the cell bypass must be activated even if the main IGBTs fail to block voltage from the bus. In the SPDT embodiment, the "break before make" actuation eliminates the possibility of bypassing a faulted bridge and thus prevents the formation of a conductive plasma which might be the result of a total energy discharge into fuses or faulted IGBTs from the faulted cell. This condition might cause additional power circuit failures.

Figure 14:
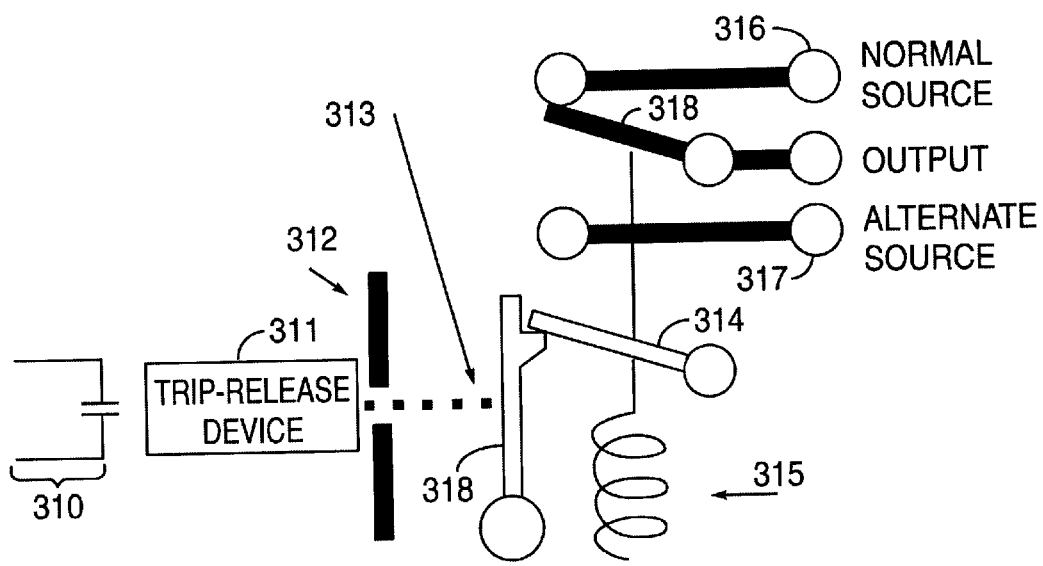
FIG. 14 is a transfer switch using a spring-loaded contact.

FIG. 14 shows a transfer switch using a spring-loaded contact. In this case a pneumatic trip release device 311 is attached to a barricade 312. A non-conducting trip lever 313 connects the trip release mechanism to the release lever 318. The switch arm 318 operates in the single-pole double-throw mode between alternative normal output sources 316 and 317. Spring 315 biases the control arm into one of two positions. In the embodiment shown the spring 315 is pulling downward on the switch arm 318. However, the downward movement of switch arm 318 is limited by the trip lever 314. In this position 318 is in electrical conduction with the normal source at 316. The trip release device may be a pneumatic device powered similar to that shown in and discussed at FIG. 13. When the trip release device is activated the latching mechanism of 318 and 314 disengage. As a result the switch arm 318 is moved to be in electrical conduction with the alternate source 317. On the device shown which utilizes a trip release device mounted adjacent to the barrier panel 312, it is also contemplated that the trip release device 311 could be mounted in close proximity to the high voltage transfer switch mechanism. In such case then it would be desirable to use the plastic tubing and remotely operated electrically activated solenoid valve of FIG. 13 for control of the transfer switch. Also shown in FIG. 14 is an auxiliary contact 310. The auxiliary contact is optional and may be utilized to electrically determine whether the transfer switch has been operated. The transfer switch of FIG. 14 is released by the electrical drive equipment by giving an electrical signal which either directly or through a pneumatic link causes the trip release device 311 to operate. 311 may, for example, be a fluid operated piston. Once the device has operated to move from its normal source to its alternate source, the transfer switch will remain in that position until switch arm 318 is mechanically moved backward causing the latch and lever 314, 318 to reengage. Under normal conditions both the transfer and the reset operations would occur under zero current conditions. The transfer switch of FIG. 14 has been shown as being a spring operated release device, such a transfer switch could also be mechanically or pneumatically operated to go between either pole of the SPDT switch unit.

FIG. 15 shows three cells A1, A2, and A3 operating in their normal mode in series. Their normal input 324 would, for example, be the node of a WYE configuration. In operation, should any one of the cells A1, A2, or A3 fail, the appropriate transfer switch 321, 322, or 323 operates to first disconnect that power cell from the circuit. As the respective switch arm of the transfer switches 321, 322 and 323 move to the other position, a series arrangement of the remaining operative cells is created.

While certain applications of the invention have been shown which utilize the peak voltage reduction methodology, it is to be understood that other embodiments may utilize the invention to balance the output voltage between phases without utilizing the "peak-voltage reduction method", such as by using angles from Tables 1–7. In addition, while some of the circuitry has shown analog methods, it is to be understood that the invention may be accomplished utilizing the appropriate software programming. Digital methods may be easily substituted for the circuitry shown. In addition, while the method used as an example in this specification has used pulse-width modulation, it is understood that other control techniques may be equally utilized in practicing this invention.

While the invention has been described in relationship to certain embodiments, it is to be understood that other embodiments created by others are also included within the invention and are covered by the claims.

What is claimed is:

1. A transfer switch for interconnecting a plurality of cells in the output of a multiphase power supply said transfer switch comprising:

(a) a single pole double throw switch assembly having a movable switch arm;

(b) a force member urging said switch arm into a first switch position;

(c) a latch member holding said switch arm in a second switch position; and (d) a pneumatically operated latch release whereby pneumatic fluid activates said transfer switch to release said latch when said switch arm is in said second position and permit said force member to transfer said switch arm to said first position.

2. The transfer switch of claim 1 further comprising:

(e) a source of pressurized fluid located remotely from said switch assembly; and (f) said source of pressurized fluid connected to said latch release by a tube of non-electrically conducting material.

3. The transfer switch of claim 2 further including:

(g) means for manually moving said switch arm from said first position to said second position against the urging of said force member.

4. A variable output device comprising:

a. a plurality of power cells connected in electrical series to provide an output;

b. at least one transfer switch for selectively interconnecting one of said plurality of cells in a series arrangement and selectively shunting an output of one of a series of failed cells;

c. said at least one transfer switch including a single pole double throw bypass switch;

d. said bypass switch connected to break connection to said failed power cell before creating a shunt path around said power cell;

e. a switch arm movable between an open position and a closed position, said closed position creating said shunt path between said output terminals;

f. a force member urging said switch arm in said closed position;

g. a latch member holding said switch arm in said open position; and h. a latch release device, said latch release device releasing said latch member such that said force member moves said switch arm to said closed position, said latch release device releasing said latch member responsive to said detecting said failed cell.

5. The variable output device of claim 4 wherein said force member comprises a spring member and said latch release device comprises one of a mechanical, pneumatic, hydraulic, electric, electronic, magnetic, and electromagnetic device.

* * * * *